(12) United States Patent
Chin et al.

(10) Patent No.: US 11,528,652 B2
(45) Date of Patent: Dec. 13, 2022

(54) DATA CONNECTION SWITCHING BASED ON ACTIVE APPLICATION

(71) Applicant: QUALCOMM Incorporated, San Diego, CA (US)

(72) Inventors: Tom Chin, San Diego, CA (US); Ajith Tom Payyappilly, San Diego, CA (US); Juan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/178,145

(22) Filed: Feb. 17, 2021

(65) Prior Publication Data
US 2021/0282065 A1  Sep. 9, 2021

Related U.S. Application Data

(60) Provisional application No. 62/986,583, filed on Mar. 6, 2020.

(51) Int. Cl.
*H04W 40/02* (2009.01)
(52) U.S. Cl.
CPC ................... *H04W 40/02* (2013.01)
(58) Field of Classification Search
CPC ...... H04W 40/02; H04W 88/06; H04W 76/16
See application file for complete search history.

(56) References Cited

U.S. PATENT DOCUMENTS

2006/0059556 A1* 3/2006 Royer ..................... G06F 9/485
                                                                   726/22
2012/0208527 A1   8/2012 Park
(Continued)

FOREIGN PATENT DOCUMENTS

CN      104115454      10/2014
CN      104582001      4/2015
(Continued)

OTHER PUBLICATIONS

"PCT Application No. PCT/US2021/018588 International Search Report and Written Opinion", dated May 28, 2021, 10 pages.

*Primary Examiner* — Marisol Figueroa
(74) *Attorney, Agent, or Firm* — Arun Swain; Holland & Hart LLP

(57) ABSTRACT

This disclosure provides systems, methods, and apparatus, including computer programs encoded on computer-readable media, for a user equipment (UE) to select a data connection based on which applications are active in a foreground process of an application processor. The UE may activate a dedicated data subscription (DDS) based on a list of active applications. In some aspects, the UE may programmatically initiate a DDS switch based on which applications are active. The UE may determine which data connection to activate as the DDS based on the application configuration information and which applications are active. Application configuration information may indicate preferences regarding different data connections to use for each application. The application configuration information may indicate a preferred radio access technology (RAT), a preferred communication network, a preferred subscription, or any combination thereof.

30 Claims, 13 Drawing Sheets

(56) References Cited

U.S. PATENT DOCUMENTS

| | | | |
|---|---|---|---|
| 2013/0227419 A1* | 8/2013 | Lee .......................... | G06F 9/48 |
| | | | 715/728 |
| 2014/0220981 A1 | 8/2014 | Jheng et al. | |
| 2015/0271805 A1 | 9/2015 | Mani et al. | |
| 2017/0280366 A1 | 9/2017 | Sahu et al. | |
| 2017/0280380 A1* | 9/2017 | Gun ..................... | H04B 1/3816 |

FOREIGN PATENT DOCUMENTS

| | | |
|---|---|---|
| EP | 3780676 | 2/2021 |
| WO | 2013143586 | 10/2013 |
| WO | 2017143609 | 8/2017 |
| WO | 2019218124 | 11/2019 |

\* cited by examiner

EXAMPLE STRUCTURES FOR APPLICATION CONFIGURATION INFORMATION

EXAMPLE TABLE WITH APPLICATION CONFIGURATION INFORMATION 600

| APP ID | PRIORITY | LIST OF IINs | |
|---|---|---|---|
| 0X01 | 1 | IIN1 (FIRST COMM NETWORK) (WEIGHT=5) | |
| | | IIN2 (SECOND COMM NETWORK) (WEIGHT=4) | |
| 0X02 | 1 | IIN1 (FIRST COMM NETWORK) (WEIGHT=5) | |
| | | IIN3 (THIRD COMM NETWORK) (WEIGHT=5) | |
| 0X03 | 2 | IIN2 (SECOND COMM NETWORK) (WEIGHT=5) | |
| | | IIN4 (FOURTH COMM NETWORK) (WEIGHT=5) | |
| 0X04 | 3 | IIN3 (THIRD COMM NETWORK) (WEIGHT=5) | |
| | | | |

EXAMPLE AVAILABLE DATA SUBSCRIPTIONS 700

| DATA SUBSCRIPTION ID | AVAILABLE IIN |
|---|---|
| 1 | IIN1 (FIRST COMM NETWORK) |
| 2 | IIN3 (THIRD COMM NETWORK) |

*FIGURE 7*

EXAMPLE ACTIVE APPLICATION INFORMATION 800

| FOREGROUND APPLICATIONS (APP ID) |
|---|
| 0X03 |
| 0X01 |

*FIGURE 8*

DATA CONNECTION SWITCHING BASED ON ACTIVE APPLICATION

CROSS-REFERENCE TO RELATED APPLICATIONS

This Patent application claims priority to U.S. Provisional Patent Application No. 62/986,583, filed Mar. 6, 2020, entitled "DEDICATED DATA SUBSCRIPTION (DDS) SWITCHING BASED ON APPLICATION," and assigned to the assignee hereof. The disclosure of the prior Application is considered part of and is incorporated by reference in this Patent Application.

TECHNICAL FIELD

Aspects of the present disclosure relate generally to wireless communication and to a user equipment (UE) with more than one subscriber information module (SIM).

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). A wireless communication system may include one or more base stations or one or more network access nodes, each simultaneously supporting communication for multiple communication devices, which may be otherwise known as user equipment (UE). Different base stations or network access nodes may implement different radio communication protocols including fourth-generation (4G) systems such as Long Term Evolution (LTE) systems, LTE-Advanced (LTE-A) systems, or LTE-A Pro systems, and fifth-generation (5G) systems which may be referred to as New Radio (NR) systems. NR, which also may be referred to as 5G for brevity, is a set of enhancements to the LTE mobile standard promulgated by the Third Generation Partnership Project (3GPP).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus for use in a user equipment (UE). The method may include selecting, from among a plurality of potential data connections, a selected data connection based on application configuration information for one or more applications that are active in the UE. The method may include communicating traffic for a first application of the one or more applications via the selected data connection.

In some implementations, the method may include selecting different data connections of the plurality of potential data connections as different applications of the one or more applications become active in the UE based on the application configuration information for applications that are active in the UE.

In some implementations, the method may include obtaining application activity information from an application processor (AP) of the UE. The application activity information may indicate that the first application is active in the UE.

In some implementations, selecting the selected data connection may be performed by an application processor (AP) of the UE, a communication control unit of the UE, a modem of the UE, or any combination thereof.

In some implementations, selecting the selected data connection includes selecting a first data subscription and a selected radio access technology (RAT) from among a plurality of RATs supported by the first data subscription. In some implementations, communicating the traffic for the first application includes activating the selected data connection using the first data subscription and the selected RAT.

In some implementations, the method may include refraining from changing an active data subscription and an active data connection of the UE while the UE is in a voice call.

In some implementations, the method may include selecting a dedicated data subscription (DDS) of the UE based on a first data subscription and a first radio access technology associated with the selected data connection. The method may include activating the first data subscription via the first radio access technology as the DDS before communicating the traffic for the first application via the selected data connection.

In some implementations, the method may include obtaining application activity information that indicates which applications are active in the UE. The method may include selecting the DDS based on application configuration information for the applications that are active.

In some implementations, the method may include performing a DDS switch to activate the first data subscription via the first radio access technology.

In some implementations, performing the DDS switch includes transmitting a first message to a first communication network to activate the first data subscription and transmitting a second message to a second communication network to cause a second data subscription to go into an idle mode.

In some implementations, activating the first data subscription as the DDS includes causing a communication unit of the UE to use a first subscriber information module (SIM) card associated with the first data subscription different from a second SIM card associated with the second data subscription.

In some implementations, the method may include, before performing the DDS switch starting a timer associated with a wait period and delaying the DDS switch until after the timer indicates completion of the wait period.

In some implementations, the method may include obtaining application activity information. The application activity information may include a list of active applications that are active in the UE. The list of active applications may be based on a list of applications in a foreground of a user interface of the UE, a list of applications executing in a foreground process of an AP of the UE, a list of applications that are attempting to transmit or receive data between the AP and a communication unit, or any combination thereof.

In some implementations, selecting the selected data connection includes obtaining the application configuration information. The application configuration information may include lists of issuer identification number (IINs) in relationship to different application identifiers. The method may include identifying one or more candidate IINs based on a first list of IINs in the application configuration information for the first application. The method may include selecting the selected data connection based on a match between the one or more candidate IINs and either a first IIN associated with a first data subscription (Sub1) or a second IIN associated with a second data subscription (Sub2).

In some implementations, the application configuration information includes a priority associated with each of the different application identifiers. In some implementations, selecting the selected data connection includes retrieving the first list of IINs associated with the first application identifier having a highest priority indicated by the application activity information and that also includes at least the first IIN or the second IIN.

In some implementations, the first list of IINs includes a weighting value associated with each candidate TIN in first list of IINs. In some implementations, selecting the first data subscription includes selecting either the first IIN or the second IIN based on their weighting value in the first list of IINs.

In some implementations, the application activity information includes a first application identifier for a first application and a second application identifier for a second application that share a highest priority in the application configuration information. In some implementations, the application configuration information includes either the first IIN or the second IIN in the corresponding lists of IINs for both the first and second applications identifiers. A first weight for the first TIN may be based on a sum of weighting values for the first IIN in the corresponding lists of IINs for the first and second application identifiers. A second weight for the second IIN may be based on a sum of weighting values for the second TIN in the corresponding lists of IINs for the first and second application identifiers. In some implementations, the method may include selecting the first TIN or the second IIN as the first data subscription based on a highest value between the first weight and the second weight.

Another innovative aspect of the subject matter described in this disclosure can be implemented in a UE. The UE may include at least one processor configured to select, from among a plurality of potential data connections, a selected data connection based on application configuration information for one or more applications that are active in the UE. The UE may include at least one modem configured to output traffic for the first application via the selected data connection.

In some implementations, the at least one processor is further configured to select different data connections of the plurality of potential data connections as different applications of the one or more applications become active in the UE based on the application configuration information for applications that are active in the UE.

In some implementations, the at least one processor is further configured to obtain application activity information from an AP of the UE. The application activity information may indicate that the first application is active in the UE.

In some implementations, the at least one processor is included in, or part of, an AP of the UE, a communication control unit of the UE, the at least one modem of the UE, or any combination thereof.

In some implementations, the at least one processor is configured to select the selected data connection based on a first data subscription and a selected radio access technology (RAT) from among a plurality of RATs supported by the first data subscription. In some implementations, the at least one modem is configured to activate the selected data connection using the first data subscription and the selected RAT.

In some implementations, the at least one processor is further configured to select a dedicated data subscription (DDS) of the UE based on a first data subscription and a first radio access technology associated with the selected data connection and cause the at least one modem to activate the first data subscription via the first radio access technology as the DDS.

In some implementations, the at least one processor is further configured to obtain application activity information that indicates which applications are active in the UE and select the DDS based on application configuration information for the applications that are active.

In some implementations, the at least one processor is further configured to cause the at least one modem to perform a DDS switch to activate the first data subscription via the first radio access technology.

In some implementations, the at least one modem is configured to output a first message to a first communication network to activate the first data subscription as part of the DDS switch and output a second message to a second communication network to cause the second data subscription to go into an idle mode as part of the DDS switch.

In some implementations, the at least one processor is further configured to obtain application activity information. The application activity information may include a list of active applications that are active in the UE. The list of active applications may be based on a list of applications in a foreground of a user interface of the UE, a list of applications executing in a foreground process of an application processor (AP) of the UE, a list of applications that are attempting to transmit or receive data between the AP and a communication unit, or any combination thereof.

In some implementations, the UE includes at least one transceiver coupled to the at least one modem. The UE may include an application processor configured to execute the one or more applications. The UE may include at least one antenna coupled to the at least one transceiver to wirelessly transmit signals output from the at least one transceiver and to wirelessly receive signals for input into the at least one transceiver. The UE may include a housing that encompasses at least the at least one modem, the at least one transceiver, the application processor, and at least a portion of the at least one antenna.

Another innovative aspect of the subject matter described in this disclosure can be implemented in a system. The system may include means for selecting, from among a plurality of potential data connections, a selected data connection based on application configuration information for one or more applications that are active in the UE. The system may include means for communicating traffic for a first application of the one or more applications via the selected data connection.

In some implementations, the system includes means for selecting different data connections of the plurality of potential data connections as different applications of the one or more applications become active in the UE based on the application configuration information for applications that are active in the UE.

Another innovative aspect of the subject matter described in this disclosure can be implemented as a UE. The UE may include a modem and a processor configured to perform any one of the above-mentioned methods.

Another innovative aspect of the subject matter described in this disclosure can be implemented as a mobile communication device. The mobile communication device may include a communication unit having at least one modem and at least one transceiver coupled to the at least one modem. The mobile communication device may include an application processor configured to execute one or more applications. The communication unit may be configured to perform the method of any one of the above-mentioned methods. The mobile communication device may include at least one antenna coupled to the at least one transceiver to wirelessly transmit signals output from the at least one transceiver and to wirelessly receive signals for input into the at least one transceiver. The mobile communication device may include a housing that encompasses at least the communication unit, the application processor, the control unit, and at least a portion of the at least one antenna.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an example table with application configuration information.

FIG. 7 shows an example table with available data subscriptions.

FIG. 8 shows an example table with application activity information.

Like reference numbers and designations in the various drawings indicate like elements.

DETAILED DESCRIPTION

Figure 1:
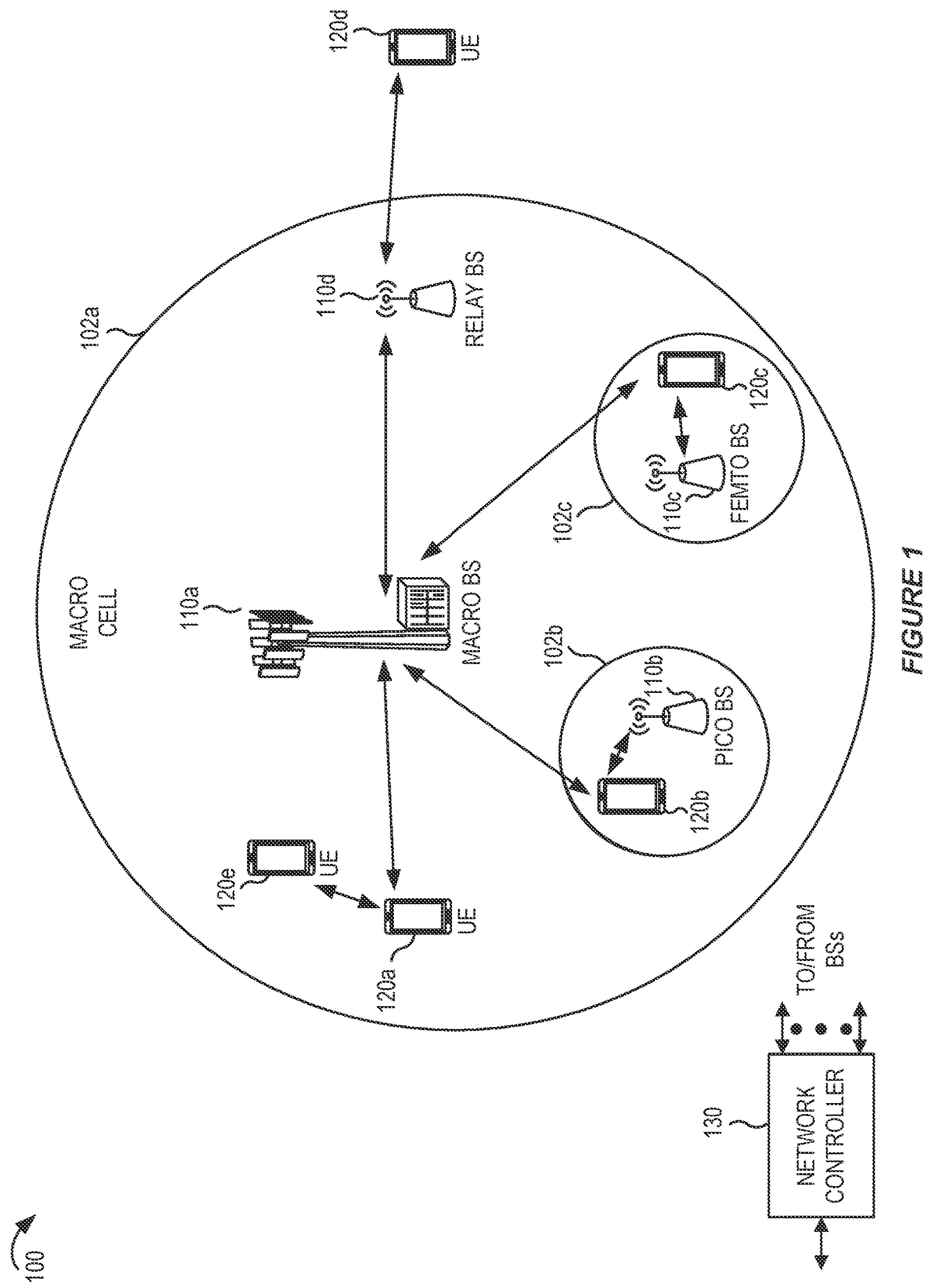
FIG. 1 shows a pictorial diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A UE may support different data connections with one or more communication networks. For example, the UE may support connections via different radio access technologies (RATs), via different data subscriptions, different networks, or any combination thereof. In some cases, the UE may be configured to camp on a network that is first available or has a highest signal strength. However, such traditional techniques for selecting a data connection may be undesirable for some particular applications. For example, a network provider may offer a first potential data connection having a higher quality of service using a particular data subscription or a particular RAT option. A first potential data connection may be more suitable for a first application while a second potential data application may be more suitable for a second application. Selecting a suitable data connection may be cumbersome for a user. Furthermore, some types of UEs may be capable of using more than one subscriber information module (sometimes referred to as SIM card) and each SIM card may be associated with one or more data subscriptions.

This disclosure provides systems, methods, and apparatus, including computer programs encoded on computer-readable media, for a UE to determine which data connection to activate based on application activity. Various implementations relate generally to determining which potential data connection to utilize based on settings associated with different applications. In some implementations, the UE may activate a selected data subscription as a dedicated data subscription (DDS) for the UE based on application activity information. Additionally, or alternatively, the UE may programmatically initiate a DDS switch based on which applications are active at a particular time. In some implementations, an application processor (AP) of the UE may generate application activity information regarding which application(s) are active in the AP or which application(s) are in the foreground of a user interface (UI). The UE may determine which potential data connection to activate based on the application activity information. Selection of a data connection may be performed by the AP of the UE or a communication modem of the UE in various implementations. In some implementations, a data connection may refer to a combination of a particular RAT and a particular data subscription. For example, a carrier may provide a data subscription that can be used with multiple RATs, each of which may be referred to as different data connections. Additionally, or alternatively, a UE may be capable of using different data subscriptions and each data subscription may support different data connections. The techniques of this disclosure enable a UE to select a selected data connection based on application activity information.

Application activity information, or active applications, may refer to foreground applications in the AP. The application activity information may include a list of applications that are actively executing in the AP. In some implementations, the application activity information may be related to the applications that are displayed in a user interface of the UE. In some implementations, the application activity information may describe applications that are executing in a foreground process of the AP but not necessarily displayed in the user interface. In some implementations, the application activity information may describe a pattern of data usage over a recent period of time (in comparison to other applications). For example, the application activity information may describe a data rate of an application. The data rate may be based on an amount of transmitted data that the application is producing or consuming over a time period.

In some implementations, a UE may select which data connection to utilize, or which data subscription to activate as the DDS, based on the application activity information as well as application configuration information. The application configuration information may include an application priority for each application. The UE may select the data subscription based on a list of data subscriptions preferred for the application having a highest priority. In some implementations, the application configuration information for an application may include a weighting of potential data subscriptions within the list of data subscriptions. The application configuration information may include weighting and prioritizations that are set by the user, network operations, or application providers, among other examples. In some implementations, a user may pre-configure the application configuration information such that the UE can automatically control the data connection selection (possibly also changing the DDS) based on the user preferences.

In various implementations, the selection of the data subscription may be performed by a communication unit (such as a modem or other component of a communication interface), an AP, or a communication control unit of the UE. For example, the AP may select the data connection and send a control message to the communication unit to cause the communication unit to activate the selected data connection or configure the selected data subscription as the DDS. In some implementations, the AP may send application activity information to the communication unit so that the communication unit may select the data connection based on the application activity information. In some implementations, a communication control unit may provide coordination of the control message or application activity information between the AP and the communication unit. In some implementations, a communication control unit may be part of, or included in, the AP or the communication unit. In some implementations, the communication control unit may select the data subscription based on application activity information from the AP and may select the data connection to activate when transmitting traffic for one or more active applications.

In some implementations, a selection of a particular data connection also may include selection of a radio access technology (RAT) from among a plurality of RATs supported by a selected data subscription. For example, the AP, the communication control unit, or the communication unit may select a particular RAT (such as 5G, LTE, GSM, or Wi-Fi™, among other examples) based on the application activity information. A 5G data connection may be more suitable for some applications, while LTE or GSM may be more suitable for other applications. The UE may select the data subscription and RAT to activate at a particular time based on which applications are active in the UE at that time. The UE may select the RAT based on application configuration information that describes preferred data subscriptions and RATs for each application.

In some implementations, the UE may refrain from performing a change to a currently activated data subscription or data connection if the UE is engaged in an active voice call. For example, if the UE has an active voice call (such as Voice over LTE, VoLTE, Voice over NR (VoNR) or Voice over Wi-Fi (VoWi-Fi)), the UE may refrain from changing the data connection to prevent disruption to the active voice call. A UE may refrain from performing a DDS switch to activate a data connection on a different data service while the UE has an active voice call in progress.

As described herein, a UE may support more than one SIM card. Each SIM may be associated with a different data subscription. For example, a first SIM may be configured with a first data subscription (Sub1) and a second SIM may be configured with a second data subscription (Sub2). UEs that can use multiple data subscriptions concurrently are referred to as multi-SIM multi-active (MSMA) devices. An MSMA device that includes two SIM cards also may be referred to as a dual SIM dual active (DSDA) device. In contrast to an MSMA device, a UE that employs multiple SIM cards but uses one subscription at a time is referred to as a multi-SIM multi standby (MSMS) device. An MSMS device that includes two SIM cards also may be referred to as a dual SIM dual standby (DSDS) device. In this disclosure, a DSDS device refers to a UE that employs at least two SIM cards (including MSMS devices) but uses one data subscription at a time for access to a data network. The data subscription that is active is referred to as dedicated data subscription (DDS). A traditional technique for selecting the DDS may require a user of the DSDS device to select the DDS in a user interface of the UE. Based on the settings in the user interface, the UE may perform a DDS switch to change from one data subscription to another data subscription. After performing a DDS switch, the new data subscription becomes the DDS for the UE, while the previously active data subscription is put into an idle mode. Using the techniques of this disclosure, the UE may manage selection of a data subscription based on active applications and application configuration information. The UE may programmatically perform a DDS switch as needed based on which applications are active at a particular time.

In some implementations, a buffer or delay feature may prevent the UE from performing consecutive DDS switches in a time period. For example, a DDS switch buffer may include a timer that prevents a DDS switch until after a time period has passed since the previous DDS switch. The delay feature may be referred to as a hysteresis function, a hold down timer, ping pong mitigation, or other term that relates to preventing excessive changes to activated data connections in the UE.

Particular implementations of the subject matter described in this disclosure can be implemented to realize one or more of the following potential advantages. A UE may dynamically activate a selected data connection based on which applications are active. A user experience may be improved by eliminating a manual process in which the user would otherwise manually manage which data connection is activated. In the context of a DDS, the UE may benefit from selecting a suitable data subscription as the DDS while preventing manual intervention each time a new DDS is required for a different active application. A DSDS device can make use of different data subscriptions with dynamic selection of the DDS at any particular time. Because a DSDS device may be less complex than a DSDA device, industry adoption may be increased while users enjoy the advantages of multiple data subscriptions. Thus, a UE may implement DSDS capability while still providing flexibility for per-application selection of different data subscriptions. In some implementations, the techniques in this disclosure may enable a user to select which data connection to use for each application based on the cost of different data subscriptions and user preferences.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

ABS 110 may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, or a relay, among other examples.

Wireless network 100 may be a heterogeneous network that includes BSs of different types, for example, macro BSs, pico BSs, femto BSs, relay BSs, among other examples. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, among other examples. A frequency also may be referred to as a carrier, a frequency channel, among other examples. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (for example, other than Orthogonal Frequency Divisional Multiple Access (OFDMA)-based air interfaces) or fixed transport layer (for example, other than Internet Protocol (IP)). In aspects, NR may utilize OFDM with a CP (herein referred to as cyclic prefix OFDM or CP-OFDM) or SC-FDM on the uplink, may utilize CP-OFDM on the downlink and include support for half-duplex operation using TDD. In aspects, NR may, for example, utilize OFDM with a CP (herein referred to as CP-OFDM) or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, DL or UL) for data transmission and the link direction for each slot may be dynamically switched. Each slot may include DL/UL data as well as DL/UL control data.

Beamforming may be supported and beam direction may be dynamically configured. MIMO transmissions with precoding also may be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As described herein, a UE may support different data connections. A communication network may offer a data subscription that can be used with more than one RAT, and each combination of data subscription and a RAT may be referred to a data connection. Additionally, or alternatively, a UE may have more than one data subscription including potentially different data subscriptions with different communication networks. Furthermore, a wireless local area network (WLAN) may be referred to as a data connection even if no subscription is associated therewith.

Figure 2:
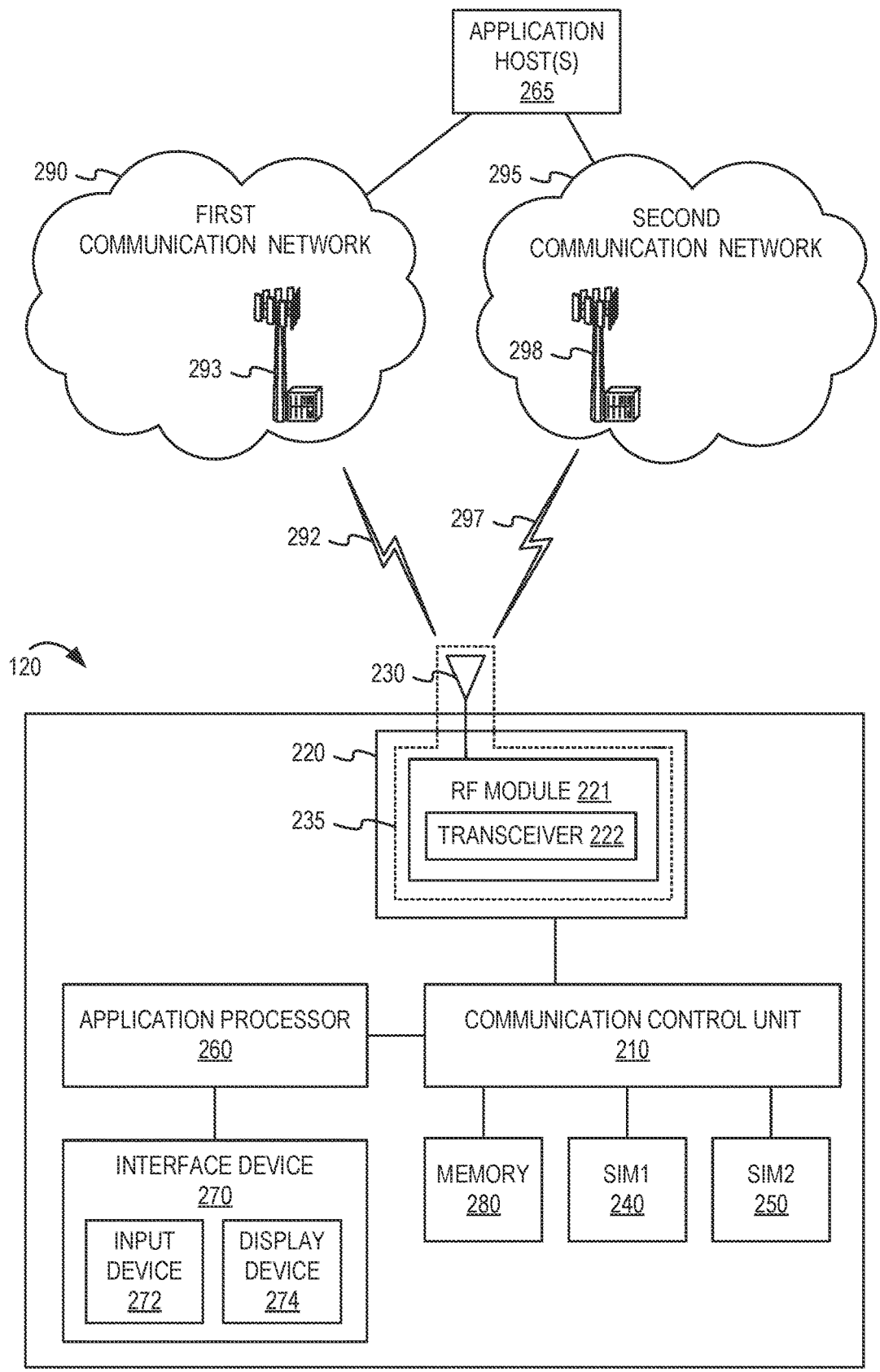
FIG. 2 shows a block diagram conceptually illustrating an example of a user equipment (UE) that implements dual subscriber information module (SIM) dual standby (DSDS) and is capable of using different data subscriptions.

FIG. 2 shows a block diagram conceptually illustrating an example of a UE that implements DSDS and is capable of using different data subscriptions. For convenience, the features in this disclosure are described in terms of DSDS devices. However, one of ordinary skill in the art will appreciate that the various features may be extended to other types of devices without departing from the scope of this description. For example, the techniques of this disclosure may be used with MSMA devices, DSDA devices, MSMA devices, or even to a UE having only a single SIM card that supports different RATs. Additionally, or alternatively, a WLAN may be a potential data connection which the UE may select based on active applications. For pedagogical purposes, some examples of this disclosure refer to a DSDS device.

As illustrated in FIG. 2, a UE 120 may include a communication control unit 210, a communication unit 220, an antenna 230, a first subscriber identity module (SIM) 240, a second SIM 250, an application processor 260, an interface device 270, and a memory 280. The UE 120 may be, for example but not limited to, a mobile telephone, smartphone, tablet, computer, among other examples. The UE 120 in FIG. 2 can be configured as a DSDS device that is capable of communications with one or more wireless networks. One of ordinary skill in the art will appreciate that the UE 120 may include one or more transceivers (communication units) and may interface with one or more antennas without departing from the scope of protection.

The communication unit 220 may include, for example, but not limited to, a radio frequency (RF) module 221. The RF module 221 may include, for example, but not limited to a first transceiver 222. An RF chain 235 may include, for example, but not limited to the antenna 230 and the RF module 221. Collectively, the RF chain 235 may implement the components described with regard to UE 120 in FIG. 2. In some implementations, the UE 120 may include more than one RF chain (not shown) without departing from the scope of protection.

The UE 120 includes a first SIM 240 and a second SIM 250. In some implementations, one or both of the SIMs 240 and 250 may be a universal integrated circuit card (UICC) that is configured with SIM or universal SIM (USIM) applications, enabling access to a one of a 5G network, a global system for mobile communications (GSM) network, or a universal mobile telecommunications system (UMTS) network, among other examples. The UICC also may provide storage for a phone book and other applications. In some implementations, one or both of the SIMs 240 and 250 may be a UICC removable user identity module (R-UIM) or a CDMA subscriber identity module (CSIM) on a card enabling access to a code division multiple access (CDMA) network. A SIM card may have a CPU, ROM, RAM, EEPROM and I/O circuits. An integrated circuit card identity (ICCID) SIM serial number may be printed on the SIM card for identification. However, a SIM may be implemented within a portion of memory of the UE 120, and thus need not be a separate or removable circuit, chip, or card.

A SIM may store user account information, an international mobile subscriber identity (IMSI), a set of SIM application toolkit (SAT) commands, and other network provisioning information, as well as provide storage space for phone book database of the user's contacts. As part of the network provisioning information, a SIM may store home identifiers (such as a system identification number (SID)/network identification number (NID) pair, or a home public land mobile network (HPLMN) code, among other examples) to indicate the SIM card network operator provider.

The interface device 270 may include an input device 272, for example, but not limited to a keyboard, touch panel, sensors, or other human interface device, and a display device 274, for example, but not limited to, a liquid crystal display (LCD), light emitting diode (LED) display, or other video display. One of ordinary skill in the art will appreciate that other input and display devices may be used without departing from the scope of this disclosure. The interface device 270 may provide a user interface for applications executed by the application processor (AP) 260.

The communication control unit 210 may be configured to control the overall operation of the UE 120 including control of the communication unit 220, the interface device 270, and the memory 280. The communication control unit 210 may be a programmable device, for example, but not limited to, a microprocessor (such as a general-purpose processor, or baseband modem processor, among other examples, including the processors described in FIGS. 11-15) or microcontroller.

The memory 280 may be configured to store operating systems or application programs for operation of the UE 120 that are executed by the communication control unit 210, as well as to store application data and user data.

The AP 260 may be configured to execute one or more applications. An active application is an application that is executing in a foreground process of the AP 260 (as compared to an inactive application that may be in a background process of the AP 260). In some implementations, an active application also may be presented for user interaction using the interface device 270. When an application is active in the application processor 260, the application may transmit data to (or consume data from) one or more application hosts 265. Thus, a data connection may be used when the application is active. One or both of the first communication network 290 and the second communication network 295 may each provide a data service for access to another data network (not shown) such as the Internet. Thus, the application host 265 may be accessed via the first communication network 290 or the second communication network 295. However, there may be different prices or quality of service associated with the different communication networks 290 and 295.

The first communication network 290 and the second communication network 295 may be operated by the same or different service providers. Furthermore, the first communication network 290 and the second communication network 295 may support the same or different radio access technologies (RATs) such as NR, LTE, GSM, CDMA, wideband CDMA (WCDMA), Time Division-Synchronous Code Division Multiple Access (TD-SCDMA), and Wi-Fi, among other examples. The first communication network 290 may include one or more base transceiver stations (BTSs) including, for example, but not limited to, a first BTS 293. The second communication network 295 also may include one or more BTSs, including, for example, but not limited to, a second BTS 298. One having ordinary skill in the art will appreciate that the network environment may include any number of communication networks, mobile communication devices, and BTSs without departing from the scope of this disclosure.

A DSDS device, such as the UE 120 described with reference to FIG. 2, may use only one subscription at a time. For example, the RF chain 235 may be used for access (such as, to receive or transmit signals) via only one data subscription at a given time. At any particular time, the UE 120 may be configured to communicate with either a first communication network 290 using a first data subscription 292 or a second communication network 295 using a second data subscription 297. The first SIM 240 may associate the communication unit 220 with a first data subscription 292 associated with a first RAT on a first communication network 290 and the second SIM 250 may associate the communication unit 220 with a second data subscription 297 associated with a second RAT on a second communication network 295. In some implementations, the communication control unit 210 may determine which SIM (and thus, which subscription) is to be used by the communication unit 220 at a given time. If the subscription can be used with different RATs of the selected communication network, the communication control unit 210 also may determine which RAT to activate using the selected SIM. The data subscription also may be referred to as a packet switch (PS) data service provided by a communication network.

Since the UE 120 is a DSDS device, the UE 120 may consider one data subscription as the DDS of the UE, while the other data subscription may be put into a standby or idle mode. The designation of which data subscription is the DDS may be changed. For example, when the DDS of the UE is the first data subscription 292, the communication unit 220 may be used with the first SIM 240 to communicate with the first communication network 290—meanwhile the second data subscription 297 may be in an idle mode and the second communication network 295 is inaccessible. The UE may perform a DDS switch to designate the second data subscription 297 as the DDS. For example, the communication unit 220 may perform a PS detach procedure with the first communication network 290 to put the first data subscription 292 into a standby or idle mode and then perform a PS attach with the second communication network 295 to activate the second data subscription 297.

There may be different reasons that a user would prefer to use a particular data subscription for different applications. For example, the first data subscription 292 may provide a higher quality of service at a higher price, while the second data subscription 297 may provide a lower quality of service at a lower price. A user may prefer the higher quality of service for a first application but may prefer the lower price for a second application. Some networks may provide free or discounted data service for a particular application. Other networks may limit or restrict data access to particular application hosts 265.

Traditionally, a user may manually control which SIM 240 or 250 is used with the communication unit 220. For example, a user may manually select one of the data subscriptions as the DDS for the UE. When switching from one application to another application, the user may manually change the DDS to control which data subscription will be used by the UE. In some situations, this process may be tedious and inefficient. Thus, in accordance with aspects of this disclosure, the UE may dynamically change the DDS (and potentially also a RAT to use with the DDS) based on which application is active in the application processor 260. The UE may obtain application configuration information that describes which data subscription(s) (or RAT(s)) are preferred for the various applications. In some implementations, the application configuration information may be user-configured. Alternatively, or additionally, the application configuration information may be configured by a network operation, service provider, application provider, or central resource.

This disclosure describes various processes and options for selecting which data connection to activate based on which applications are active in the application processor 260. Activating a data connection may include selecting a data subscription associated with the data connection as the DDS. The application processor 260 may generate application activity information regarding which applications are active in the application processor 260. In some implementations, the communication control unit 210 may select which data connection to activate based on the application activity information and the application configuration information. Alternatively, or additionally, the application processor 260 may select the data connection.

In some implementations, the application processor 260 may determine which data subscriptions are available (based on the SIM options) and select the DDS using the application activity information and the application configuration information. Alternatively, or additionally, the communication unit 220 may select the DDS. For example, the communication unit 220 may obtain the application activity information from the application processor 260 (such as via the communication control unit 210). The communication unit 220 also may obtain the application configuration information and list of available data subscriptions and may determine which data subscription to activate as the DDS using the techniques described herein. For brevity, the examples in this disclosure are based on the communication control unit 210 making the DDS selection. However, features described with reference to the communication control unit 210 may be implemented in the communication unit 220 or the application processor 260. In some implementations, the features described with reference to the communication control unit 210 may be implemented by a combination of the communication unit 220 and the application processor 260.

Figure 3:
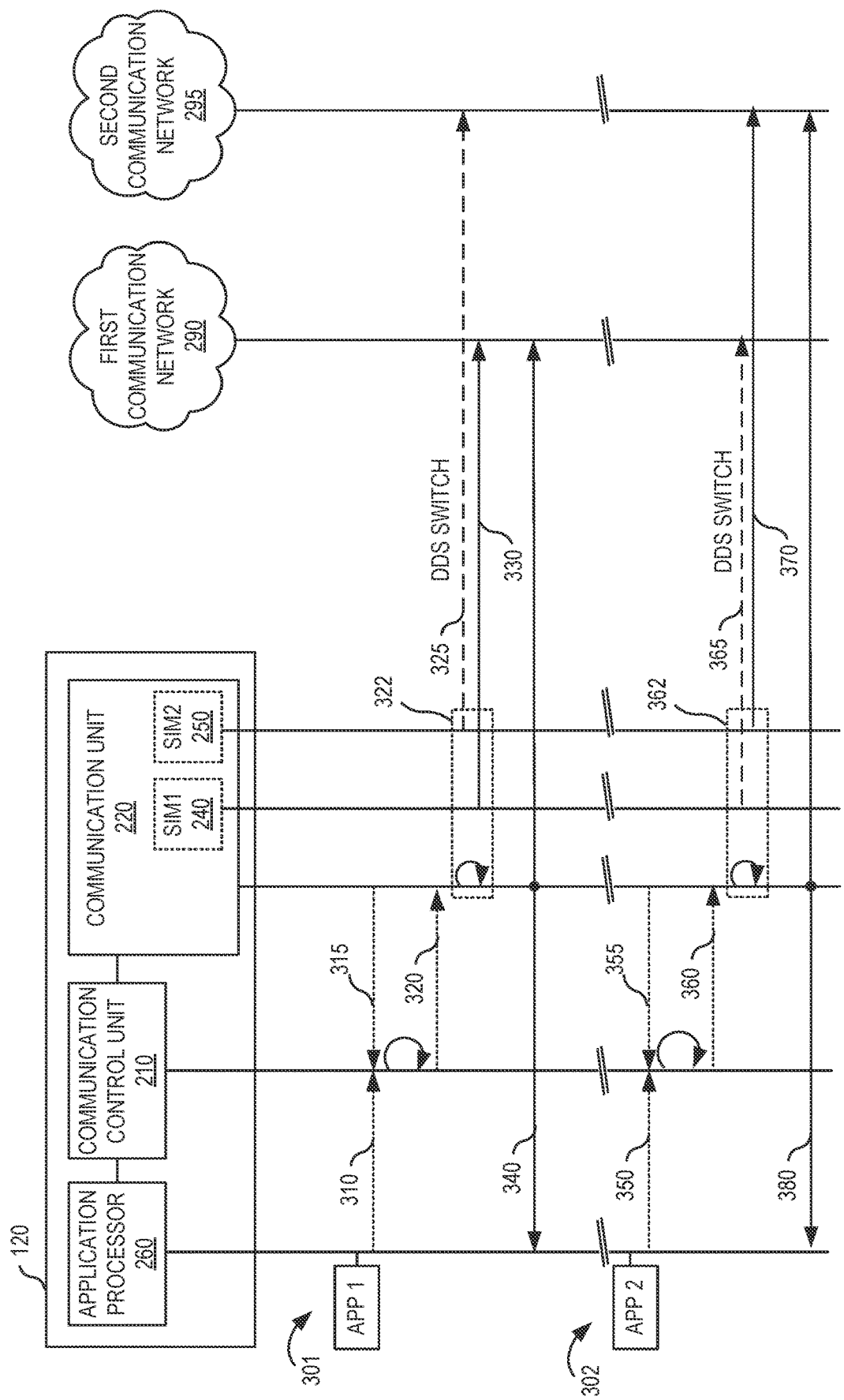
FIG. 3 shows an example process and message flow for changing a data connection.

FIG. 3 shows an example process and message flow for changing a data connection. In FIG. 3, the UE 120 may be capable of accessing data subscriptions with the first communication network 290 or the second communication network 295 using the first SIM 240 or the second SIM 250, respectively. The UE 120 is illustrated with the application processor 260, the communication control unit 210, and the communication unit 220 as described with reference to FIG. 2. For purposes of this description, a first data connection is associated with a first data subscription of the first communication network 290. A second data connection is associated with a second data subscription of the second communication network 295. In some implementations, each data connection may refer to a particular RAT (not shown) supported by the data subscriptions of the communication networks.

In a first example 301, the application processor 260 may determine that a first application ("APP 1") is active in the foreground (such as a foreground process or user interface) of the application processor 260. The application processor 260 may send application activity information 310 to the communication control unit 210. The application activity information 310 may include a list of active foreground applications and may identify the APP 1 as currently active. The communication control unit 210 also may determine which potential data connections or which potential data subscriptions are available. For example, the communication control unit 210 may determine or obtain a list of potential data connections or a list of available data subscriptions. The communication control unit 210 may obtain such information 315 based on the configurations in the first SIM 240 and the second SIM 250. In some implementations, the communication control unit 210 may determine available RATs associated with each available data subscription. The communication control unit 210 may determine or obtain application configuration information that indicates data subscription preferences (or RAT preferences, or both) for each application. Using the application configuration information, the application activity information 310, and information regarding the potential data connections or the list of available data subscriptions, the communication control unit 210 may select a first data connection associated with the first data subscription of the first communication network 290.

In some implementations, the UE 120 may communicate traffic for the active application ("APP 1") via the selected first data connection. Alternatively, or additionally, the UE 120 may perform a DDS switch to activate the first data subscription before communicating traffic for the active application via the selected first data connection. For example, the communication control unit 210 may determine that the first data subscription is not currently the DDS of the UE 120 and may initiate a DDS switch. For example, the communication control unit 210 may send a DDS switch request 320 to the communication unit 220. The communication unit 220 may perform a DDS switch 322 to activate the first data subscription with the first communication network 290 and deactivate a second data subscription with the second communication network 295. The DDS switch 322 may include a first message 325 (such as a PS detach message or radio resource configuration (RRC) connection change message) to the second communication network 295 to deactivate the second data subscription. It is noted that deactivating the second data subscription may cause the second data subscription to go into an idle mode or standby state without fully disconnecting the second communication network 295. The DDS switch 322 also may include a second message 330 to activate (or reactivate) the first data subscription with the first communication network 290. For example, the first data subscription may be in an idle mode or standby state. The second message 330 may cause the first data subscription to reactivate or reconnect with the first communication network 290.

In some implementations, the communication unit 220 may implement a wait timer (which also may be referred to as a DDS buffer timer) to prevent or delay a DDS switch until a time period after a previous DDS switch. Furthermore, the communication unit 220 may prevent or delay the DDS switch 322 if the UE 120 is currently using the first communication network 290 for a voice call. The DDS switch 322 may include other messaging or operations (not shown).

After performing the DDS switch 322, the communication unit 220 may be configured to use the first data subscription (to the first communication network 290) as the DDS. Therefore, the communication unit 220 will enable communications 340 to or from the application processor 260 and the first communication network 290.

In a second example 302, the application processor 260 may determine that a second application ("APP 2") is active in the foreground. The APP 1 may no longer be active or may have a lower priority than the APP 2. The application processor 260 may send application activity information 350 to the communication control unit 210. The application activity information 350 may include a list of active foreground applications and may identify the APP 2 as currently active. If the communication control unit 210 does not already know the list of potential data connections or the list of available data subscriptions, the communication control unit 210 may determine or obtain such information 355 based on the configurations in the first SIM 240 and the second SIM 250. Using the application configuration information, the application activity information 310, and the list of potential data connections or the list of available data subscriptions, the communication control unit 210 may select the second data connection associated with the second data subscription. In some implementations, the UE 120 may communicate traffic for the active application (APP 2) via the selected second data connection. Alternatively, or additionally, the UE 120 may perform a DDS switch to activate the second data subscription before communicating traffic for the active application via the selected second data connection.

In some implementations, the communication control unit 210 may cause the communication unit 220 to activate the second data subscription (related to the second SIM 250) as the DDS. The communication control unit 210 may send a DDS switch request 360 to the communication unit 220 initiate a DDS switch 362 to the second data subscription. The communication unit 220 may perform a DDS switch 362 to activate the second data subscription with the second communication network 295 and deactivate the first data subscription with the first communication network 290. As described in the first example 301, the DDS switch 362 may include messages 365 and 370 to the first communication network 290 and second communication network 295, respectively to deactivate the first data subscription and activate the second data subscription. After performing the DDS switch 362, the communication unit 220 may be configured to use the second data subscription (to the second communication network 295) as the DDS. Therefore, the communication unit 220 will enable communications 380 to or from the application processor 260 and the second communication network 295.

Figure 4:
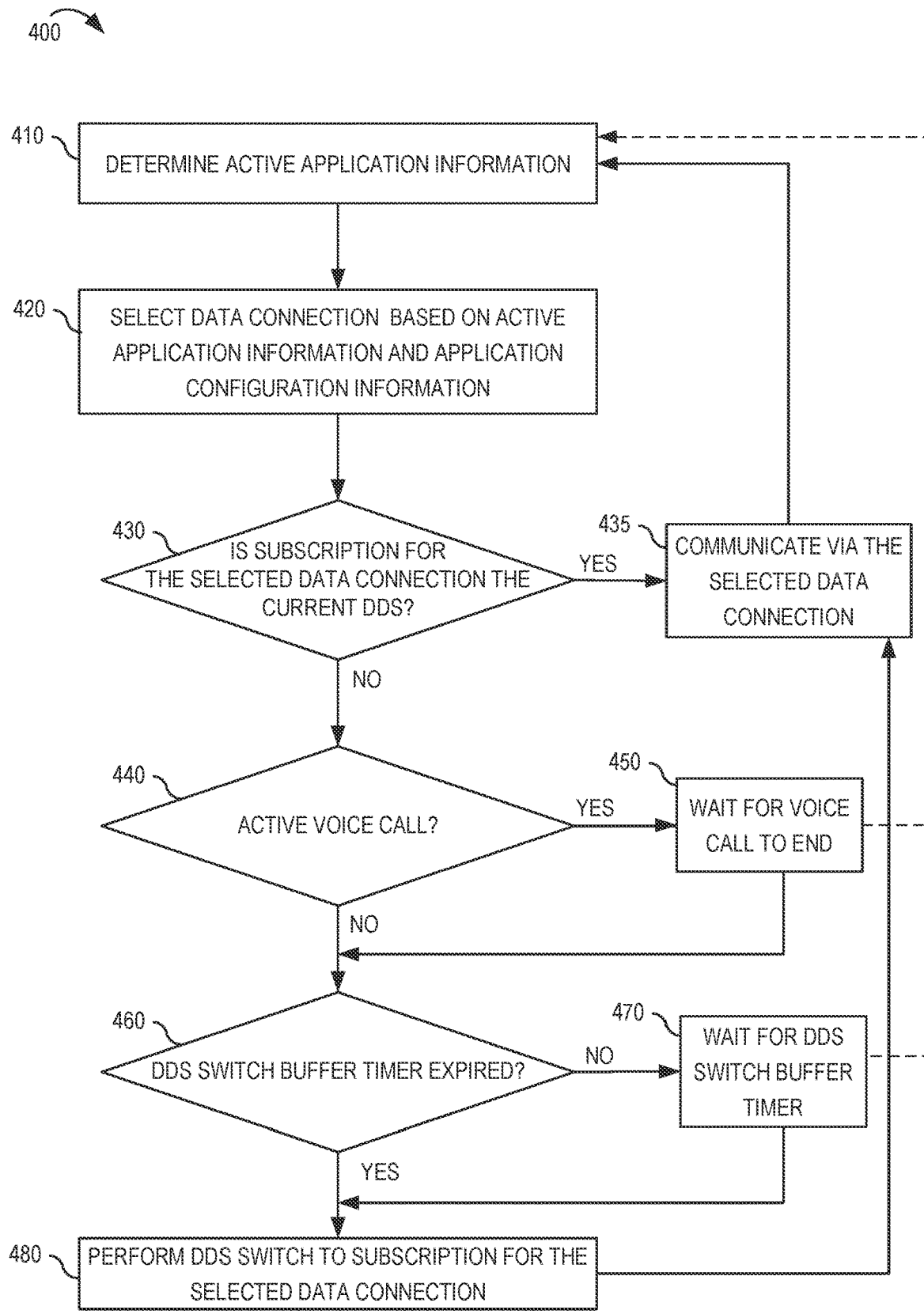
FIG. 4 shows a flowchart illustrating an example process for managing a DDS of the UE.

FIG. 4 shows a flowchart illustrating an example process for managing a DDS of the UE. The operations of process 400 may be implemented by a UE or its components as described herein. For example, the process 400 may be performed by an apparatus such as any of the UEs 120 or any component thereof (such as the communication control unit 210, the application processor 260, or the communication unit 220) as described herein, the wireless communication apparatus 1100 described with reference to FIG. 11, or the mobile communication device 1204 described with reference to FIG. 12.

At block 410, the apparatus may determine application activity information. For example, the apparatus may obtain a list of foreground applications from an AP of the UE. The application activity information may describe one or more applications that are active in the UE.

At block 420, the apparatus may select a data connection based on the application activity information and application configuration information. The descriptions with regard to FIGS. 5A-9 include examples of using application activity information and application configuration information to select a data connection.

At block 430, the apparatus may determine if a subscription (referred to as selected data subscription) for the selected data connection is the current DDS for the UE. If the selected data subscription is already the DDS, the process 400 may continue to block 435. At block 435, the apparatus may communicate traffic for the active applications via the selected data connection. If the selected data subscription is not the current DDS, the process 400 may proceed to block 440.

Blocks 440-470 provide example criteria which may be used to prevent or delay a DDS switch. At block 440, the apparatus may determine whether the UE is engaged in an active voice call. If the UE is engaged in an active voice call, the process 400 proceeds to block 450, where the apparatus may wait for the active voice call to end. After the voice call has ended, or if there is no active voice call, the process 400 proceeds to block 460.

At block 460, the apparatus may determine if a DDS switch buffer timer is expired. The DDS switch buffer timer may be a timer that is initiated after a previous DDS switch. The DDS switch buffer timer may be used to prevent successive DDS switch operations within a time period. In some implementations, the DDS switch buffer timer may be implemented as a countdown timer that is initialized as part of a DDS switch. At block 460, if the DDS switch buffer timer is not expired (meaning not enough time has passed since the previous DDS switch), the process 400 may proceed to block 470. At block 470, the apparatus may wait for the DDS switch buffer timer to expire. After the DDS switch buffer timer has expired in block 470, or if the DDS switch buffer timer was expired in block 460, the process 400 may proceed to block 480.

At block 480, the apparatus may perform a DDS switch to activate the data subscription for the selected data connection as the DDS. After activating the data subscription and the selected data connection, the process 400 may proceed to block 435. At block 435, the apparatus may communicate traffic for the active applications via the selected data connection.

The example criteria described with reference blocks 440-470 of FIG. 4 are provided for illustrative purposes. In some implementations, the example criteria may be arranged in a different order or may include more or less criteria blocks. Furthermore, any of the criteria may be used to limit, prevent, or delay a DDS switch. In some implementation, when the DDS switch is prevented or delayed, the process 400 may proceed to an earlier block (such as block 410). For example, the process 400 may include a reevaluation of the application activity information to verify that a previously-selected data subscription is still preferred or if a different data subscription should be selected as the DDS.

The application configuration information in this disclosure may include a variety of parameters. FIGS. 5A-5D provide several example structures and parameters that may be included in the application configuration information.

Figure 5A:
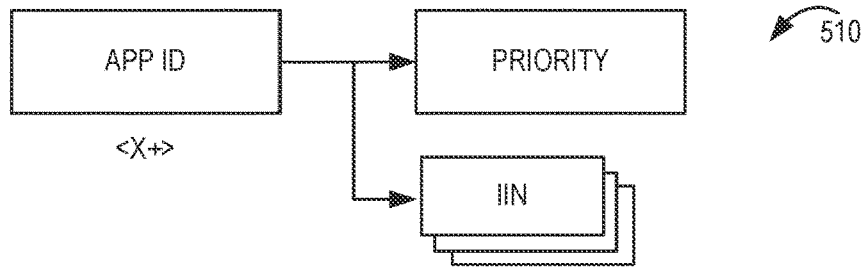
FIG. 5A shows an example structure for application configuration information.

FIG. 5A shows an example structure 510 for application configuration information. The application configuration information may include a list of application identifiers (APP IDs). For each APP ID, the application configuration information may include a priority value and a list of communication networks. The priority value may be used to indicate relative priority (or ranking) of the applications. The list of communication networks may indicate the preferred communication network (and by extension the corresponding data subscription) for each application. The list of communication networks may include a single preferred communication network or may include a list of communication networks that are preferred for the application. In some implementations, each communication network may be identified by a different Issuer Identification Number (IIN). Each network provider may have one or more unique IINs that identify wireless communication networks. Thus, the application configuration information may include a list of IINs that are preferred for use with each application. The use of IINs in the application configuration information may facilitate selection of a data subscription because the IIN may correspond to an ICCID in each SIM card.

Figure 5B:
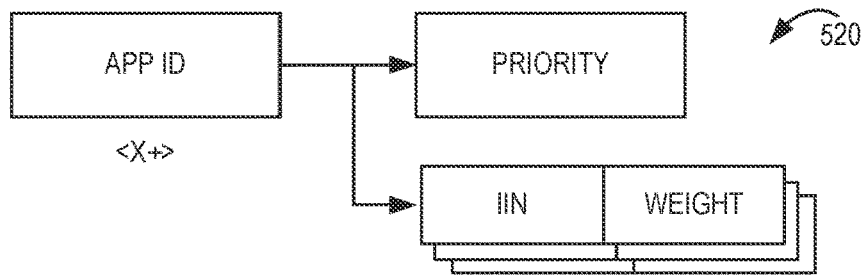
FIG. 5B shows an example structure for application configuration information that includes weighting information.

FIG. 5B shows an example structure 520 for application configuration information that includes weighting information. In addition to the APP ID, priority, and list of IINs for each application, the application configuration information may include a weighting value for each TIN in the list of IINs. For example, the weighting value may indicate a preference for one TIN over another TIN in the list of IINs for a particular application. In some implementations, the weighting may be derived based on an ordering of the list of IINs.

Figure 5C:
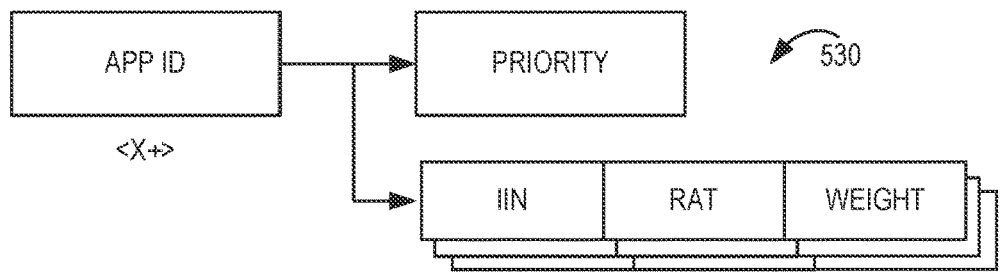
FIG. 5C shows an example structure for application configuration information that includes radio access technology (RAT) settings.

FIG. 5C shows an example structure 530 for application configuration information that includes RAT settings. For example, the application configuration information may include a RAT parameter for each IIN in the list of IINs. This example structure 530 may be useful when the application configuration information defines only a particular RAT or RATs of a communication network should be used. For example, an IIN and a first RAT option may be given a weighting over that same IIN and a second RAT option. In another example, the RAT parameter may be used to indicate that a particular IIN should be considered for the DDS when a particular RAT (such as 5G or LTE) is available and that a different RAT (such as GSM or UMTS) should not be considered for the DDS.

Figure 5D:
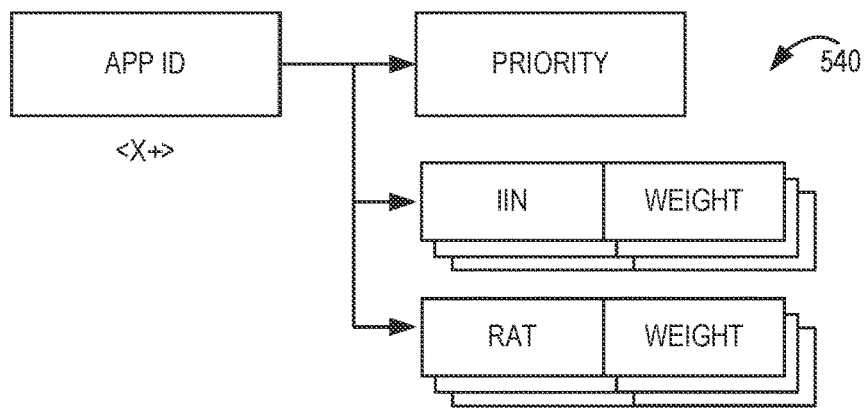
FIG. 5D shows an example structure for application configuration information that includes RAT selection information.

FIG. 5D shows an example structure 540 for application configuration information that includes RAT selection information. The application configuration information may include the APP ID, priority, list of IINs and weighting as described with reference to FIG. 5B. Additionally, the application configuration information may include a list of RATs and weights for each. This example structure 540 may be useful when the application configuration information is used to select the TIN first and then the RAT is selected once the TIN is selected.

FIG. 6 shows an example table 600 with application configuration information. The example table 600 is based on the example structure 520 described with reference to FIG. 5B. Thus, the application configuration information in the example table 600 includes the APP ID, priority, and list of IINs. There is application configuration information for four applications in the example table 600. Examples of the applications may include WeChat™, QQ™, Weibo™, Taobao™, Baidu™, Facebook™, Twitter™, Instagram™, YouTube™, and Gmail™, among other examples. The application configuration information for a first application 610 may have an APP ID of "0x01," a priority of "1," and a first list of IINs. Although the APP ID is represented as an ordinal number in this disclosure, the APP ID may be represented as a text string or other format. In some implementations, the APP ID may be a unique identifier that is specific to each application, such as an identifier for the application within an application store. The first list of IINs for the first application includes a first communication network (identified by IIN1) having a weight of "5" and a second communication network (identified by IIN2) having a weight of "4." The application configuration information for a second application 620 may have an APP ID of "0x02," a priority of "1," and a second list of IINs. The second list of IINs for the second application includes the IIN1 having a weight of "5" and an IIN3 (identifying a third communication network) having a weight of "5." The application configuration information for a third application 630 may have an APP ID of "0x03," a priority of "2," and a third list of IINs. The third list of IINs for the third application includes the IIN2 having a weight of "5" and an IIN4 (identifying a fourth communication network) having a weight of "5." The application configuration information for a fourth application 640 may have an APP ID of "0x04," a priority of "3," and a fourth list of IINs. The fourth list of IINs for the fourth application includes the IIN3 having a weight of "5."

FIG. 7 shows an example table 700 with available data subscriptions.

There are two data subscriptions available in the example table 700. A first data subscription may be related to an IIN1

(for a first communication network). A second data subscription may be related to an IIN3 (for a third communication network). The IIN1 may correspond to an ICCIN in a first SIM card. The IIN3 may correspond to an ICCIN in a second SIM card. If a UE is a MSMS device, it may have more than two SIM cards and may support more than two available data subscriptions.

FIG. 8 shows an example table 800 with application activity information. The application activity information may be represented as a list of foreground applications. The list of foreground applications represent which applications are executing in a foreground process of the AP and may or may not correspond to the concepts of a foreground view of a user interface. In the example table 800, the list of foreground applications includes APP IDs for the foreground applications. The list of foreground applications includes the APP ID for a third application ("0x03") and a first application ("0x01").

Using the example tables 600, 700, and 800 described with reference to FIGS. 6-8, some examples may be described to illustrate selection of a data subscription to set as the DDS of the UE.

As first example is based on the data as presented in the example tables 600, 700, and 800. Based on the list of foreground applications in the application activity information, the first application (APP ID 0x01) and the third application (APP ID 0x03) are active. Thus, the application configuration information for the first application 610 and the third application 630 will be considered. Because the first application has a higher priority ("1") compared to the second application, the first list of IINs for the first application will have a higher priority. The first list of IINs includes IIN1 and IIN2 (weighted in that order). Because the IIN1 is included in the list of available data subscriptions, the IIN1 is selected as the data subscription to set as the DDS. If the DDS of the UE is not currently set to the data subscription for the IIN1, the UE may perform a DDS switch.

For the remaining examples, the application configuration information in the example table 600 and the list of available data subscriptions in example table 700 will remain the same. However, the list of foreground applications may change over time. This is similar to a realistic deployment because the inserted SIM cards and the application configuration information is generally stable, while the execution of applications may change more frequently.

In a second example, the list of foreground applications may indicate that the third application (APP ID 0x03) and the fourth application (APP ID 0x04) are active. Thus, the application configuration information for the third application 630 and the fourth application 640 will be considered. Because the third application has a higher priority ("2") compared to the fourth application, the third list of IINs for the third application will have a higher priority. The third list of IINs includes IIN2 and IIN4 (having an equal weighting). Because neither of the IIN2 nor the IIN4 is included in the list of available data subscriptions, the application configuration information for the third application 630 may be disregarded. The application configuration information for the fourth application 640 has the next highest priority ("3"), and thus the fourth list of IINs will be considered. The fourth list of IINs includes IIN3, which is also in the list of available data subscriptions. Thus, the IIN3 is selected as the data subscription to set as the DDS. If the DDS of the UE is not currently set to the data subscription for the IIN3, the UE may perform a DDS switch.

In a third example, the list of foreground applications may indicate that the second application (APP ID 0x02) and the fourth application (APP ID 0x04) are active. Thus, the application configuration information for the second application 620 and the fourth application 640 will be considered. Because the second application has a higher priority ("1") compared to the fourth application, the second list of IINs for the second application will have a higher priority. The second list of IINs includes IIN1 and IIN3 (having an equal weighting). Because both the IIN1 and IIN3 are included in the list of available data subscriptions and have the same weighting, either of the data subscriptions related to IIN1 and IIN3 may be set as the DDS. No DDS switch may be performed if the DDS is already using either of the IIN1 or the IIN3.

In a fourth example, the list of foreground applications may indicate that the first application (APP ID 0x01), the second application (APP ID 0x02) and the third application (APP ID 0x03) are active. Thus, the application configuration information for all three applications 610, 620, and 630 will be considered. Because the first application and the second application both have a higher priority ("1") compared to the third application, the first list of IINs for the first application and the second list of IINs for the second application will have a higher priority. In this example, both the first and second list of IINs may be considered since both the first and second applications have the same priority. An apparatus may determine the cumulative weight of the IINs to determine which IIN to select. For example, the weight values for the same IINs may be added to determine the cumulative weight value for that IIN. The first list of IINs includes IIN1 (weight=5) and IIN2 (weight=4). The second list of IINs includes IIN1 (weight=5) and IIN3 (weight=5). The cumulative weight value for the IIN1 is "10" (determined by adding the weights of "5" and "5" from the first and second list of IINs, respectively). The cumulative weight value of the IIN2 is "5" (determined by the weight of "5" from the first list of IINs). The cumulative weight value of the IIN3 is "4" (determined by the weight of "4" from the second list of IINs). Because the IIN1 has the highest weight value and is in the list of available data subscriptions, the IIN1 is selected as the data subscription to set as the DDS. If the DDS of the UE is not currently set to the data subscription for the IIN1, the UE may perform a DDS switch. It is noted that if the IIN1 was not in the list of available data subscriptions (or a connectivity error prevents its use), the IIN 3 would be selected because the IIN2 is not in the list of available data subscriptions.

The examples described herein are intended as illustrative examples. Other techniques may be used for selecting a data subscription using the application activity information and the application configuration information. For example, the application activity information could be based on a data rate or a pattern of data usage over a recent time period. For example, a first application may be responsible for a majority of the traffic in the past x minutes (such as 5 minutes) and may have a weighted preference for the data subscription with IIN1. A second application may be responsible for less traffic during the same time period and may have a weighted preference for the data subscription with IIN2. If the second list of IINs for the second application also includes IIN1, the data subscription with IIN1 may be selected as the DDS based on based on the historical data usage. Other variations based on pattern of data usage, preference settings, or weighting may be possible within the scope of this disclosure.

Figure 9:
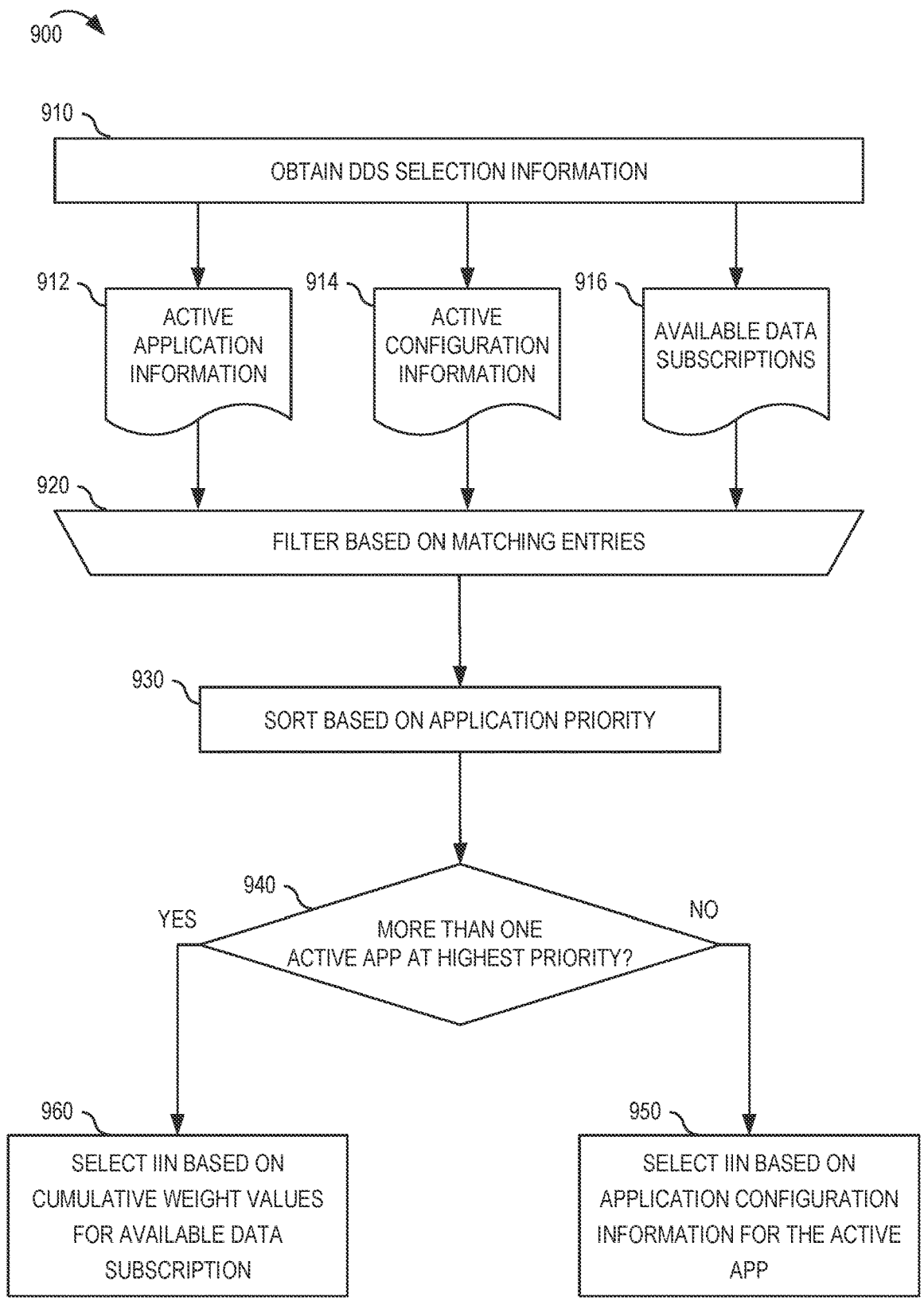
FIG. 9 shows a flowchart illustrating an example process for selecting a data subscription.

FIG. 9 shows a flowchart illustrating an example process 900 for selecting a data subscription. The operations of process 900 may be implemented by a UE or its components as described herein. For example, the process 900 may be performed by an apparatus such as any of the UEs 120 or any component thereof (such as the communication control unit 210, the application processor 260, or the communication unit 220) as described herein, the wireless communication apparatus 1100 described with reference to FIG. 11, or the mobile communication device 1204 described with reference to FIG. 12.

At block 910, the apparatus may obtain DDS selection information. For example, the DDS selection information may include application activity information 912, application configuration information 914, and a list of available data subscriptions 916.

At block 920, the apparatus may filter the DDS selection information based on matching information. For example, the determine the application configuration information for applications that are indicated as active in the application activity information and that have an IIN in the list of available data subscriptions.

At block 930, if the application configuration information is not already sorted, the apparatus may sort the results of block 920 based on application priority. At block 940, the apparatus may determine if there is more than one active application having the same highest priority in the filtered list. If not (meaning there is only a single application from the filtered list that has a highest priority), the process 900 proceeds to block 950. At block 950, the apparatus may select the TIN based on the application activity information for the application having the highest priority within the filtered list.

At block 940, if there is more than one application having the same highest priority in the filtered list, the process 900 may proceed to block 960. At block 960, the apparatus may select the TIN based on cumulative weight values for each of the available data subscription.

The selected IIN may indicate which communication network (thus which data subscription) to activate as the DDS. In some implementations, the selection of the data subscription also may include selection of a RAT. For example, the selection of the data subscription may include selecting which RAT to connect as the DDS for the UE.

Figure 10:
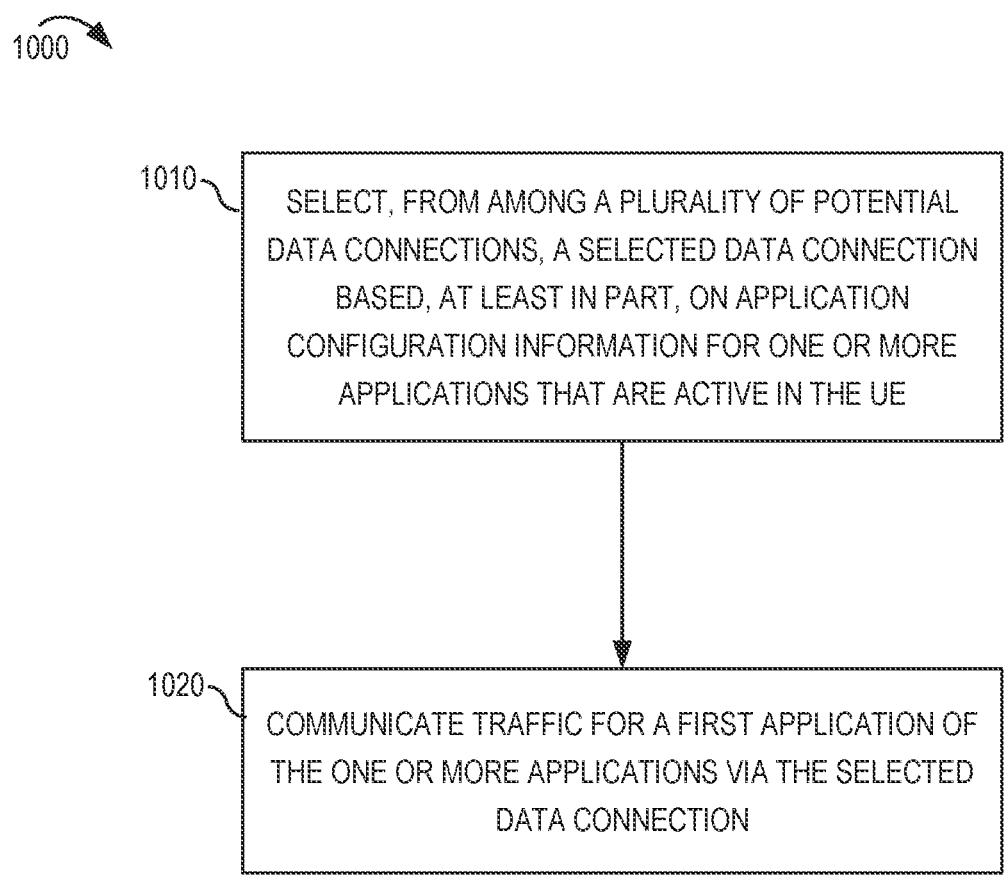
FIG. 10 shows a flowchart illustrating an example process for managing data subscriptions.

FIG. 10 shows a flowchart illustrating an example process 1000 for managing data subscriptions. The operations of process 1000 may be implemented by a UE or its components as described herein. For example, the process 1000 may be performed by an apparatus such as any of the UEs 120 or any component thereof (such as the communication control unit 210, the application processor 260, or the communication unit 220) as described herein, the wireless communication apparatus 1100 described with reference to FIG. 11, or the mobile communication device 1204 described with reference to FIG. 12.

The process 1000 begins with block 1010. At block 1010, the apparatus may select, from among a plurality of potential data connections, a selected data connection based, at least in part, on application configuration information for one or more applications that are active in the UE. At block 1020, the apparatus may communicate traffic for a first application of the one or more applications via the selected data connection.

Figure 11:
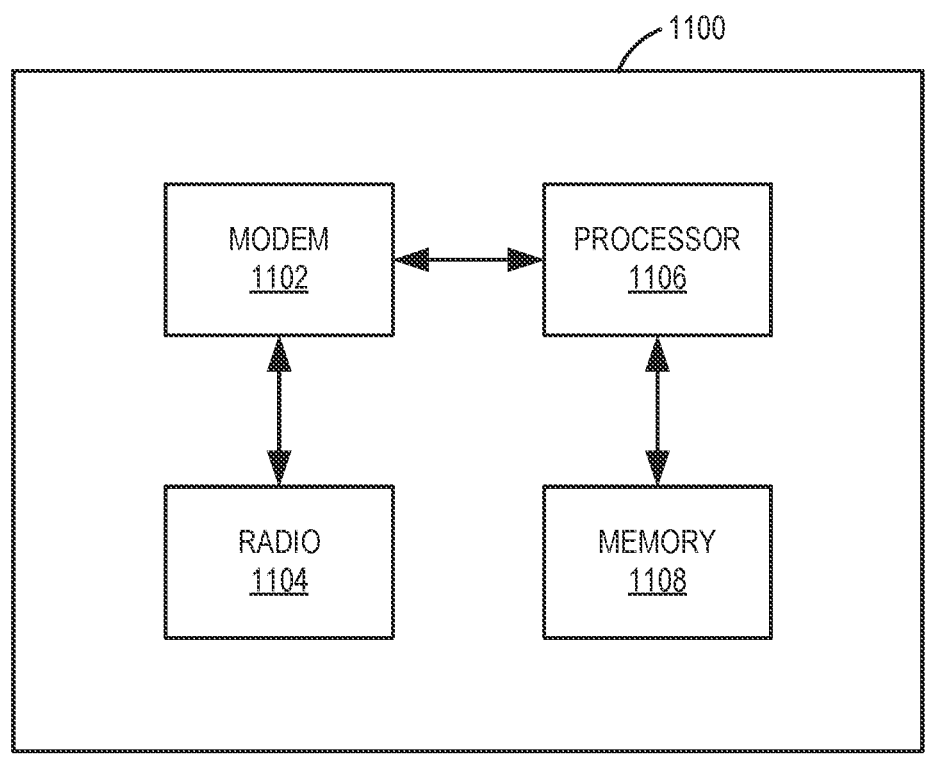
FIG. 11 shows a block diagram of an example wireless communication apparatus.

FIG. 11 shows a block diagram of an example wireless communication apparatus 1100. In some implementations, the wireless communication apparatus 1100 can be an example of a device for use in a mobile communication device, such as UE 120 described herein. The wireless communication apparatus 1100 is capable of transmitting (or outputting for transmission) and receiving wireless communications.

The wireless communication apparatus 1100 can be, or can include, a chip, system on chip (SoC), chipset, package, or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 1100 may include one or more modems 1102. In some implementations, the one or more modems 1102 (collectively "the modem 1102") may include a WWAN modem (for example, a 3GPP 4G LTE or 5G compliant modem). In some implementations, the wireless communication apparatus 1100 also includes one or more radios 1104 (collectively "the radio 1104"). In some implementations, the wireless communication apparatus 1100 further includes one or more processors, processing blocks or processing elements 1106 (collectively "the processor 1106") and one or more memory blocks or elements 1108 (collectively "the memory 1108").

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, automatic gain control (AGC), a coder, a decoder, a multiplexer and a demultiplexer.

The radio 1104 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 1100 can include, or be coupled with, multiple transmit antennas (each with a corresponding transmit chain) and multiple receive antennas (each with a corresponding receive chain). The symbols output from the modem 1102 are provided to the radio 1104, which then transmits the symbols via the coupled antennas. Similarly, symbols received via the antennas are obtained by the radio 1104, which then provides the symbols to the modem 1102.

The processor 1106 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. In some implementations, the processor 1106 may generally control the modem 1102 to cause the modem to perform various operations described above.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processor 1106, cause the processor to perform various operations described herein. For example, various functions of components disclosed herein, or various blocks or steps of a method, operation, process or algorithm disclosed herein, can be implemented as one or more modules of one or more computer programs.

Figure 12:
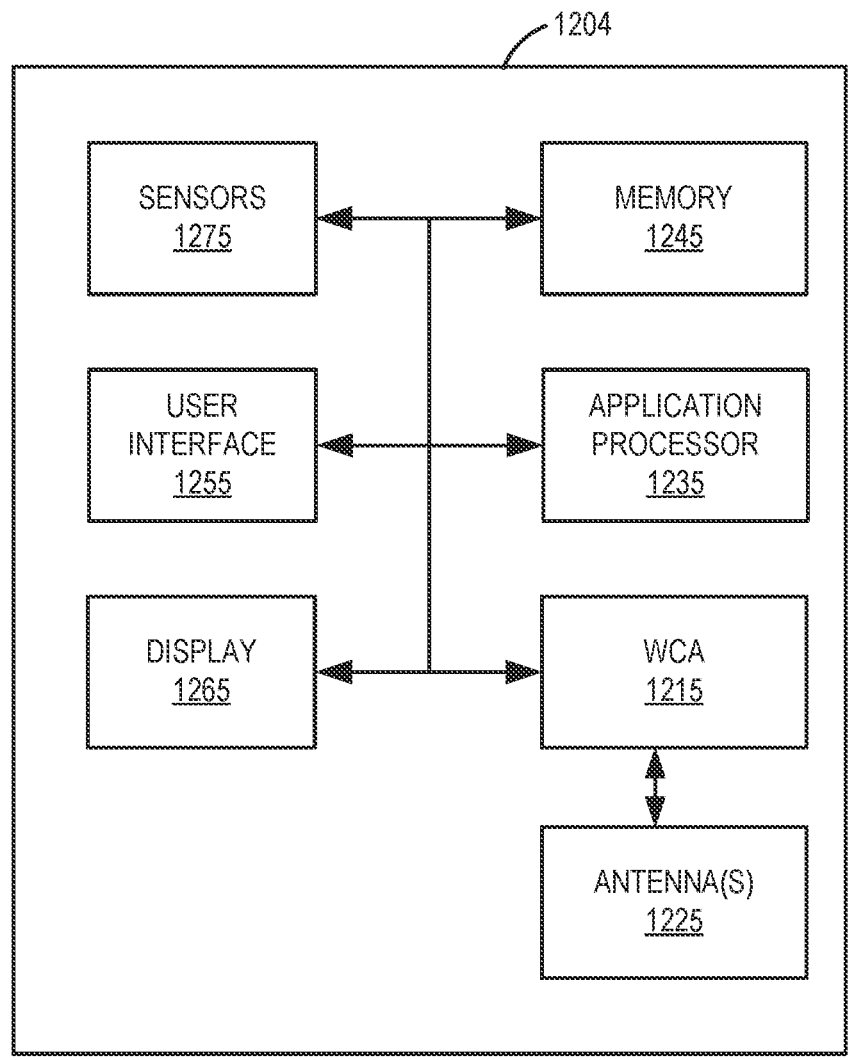
FIG. 12 shows a block diagram of an example mobile communication device.

FIG. 12 shows a block diagram of an example mobile communication device 1204. For example, the mobile communication device 1204 can be an example implementation of the UE 120 described herein. The mobile communication device 1204 includes a wireless communication apparatus 1215. For example, the wireless communication apparatus 1215 may be an example implementation of the wireless communication apparatus 1100 described with reference to FIG. 11. The mobile communication device 1204 also includes one or more antennas 1225 coupled with the wireless communication apparatus 1215 to transmit and receive wireless communications. The mobile communication device 1204 additionally includes an application processor 1235 coupled with the wireless communication apparatus 1215, and a memory 1245 coupled with the application processor 1235. In some implementations, the mobile communication device 1204 further includes a user interface (UI) 1255 (such as a touchscreen or keypad) and a display 1265, which may be integrated with the UI 1255 to form a touchscreen display. In some implementations, the mobile communication device 1204 may further include one or more sensors 1275 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1204 further includes a housing that encompasses the wireless communication device 1215, the application processor 1235, the memory 1245, and at least portions of the antennas 1225, UI 1255, and display 1265.

Figure 13:
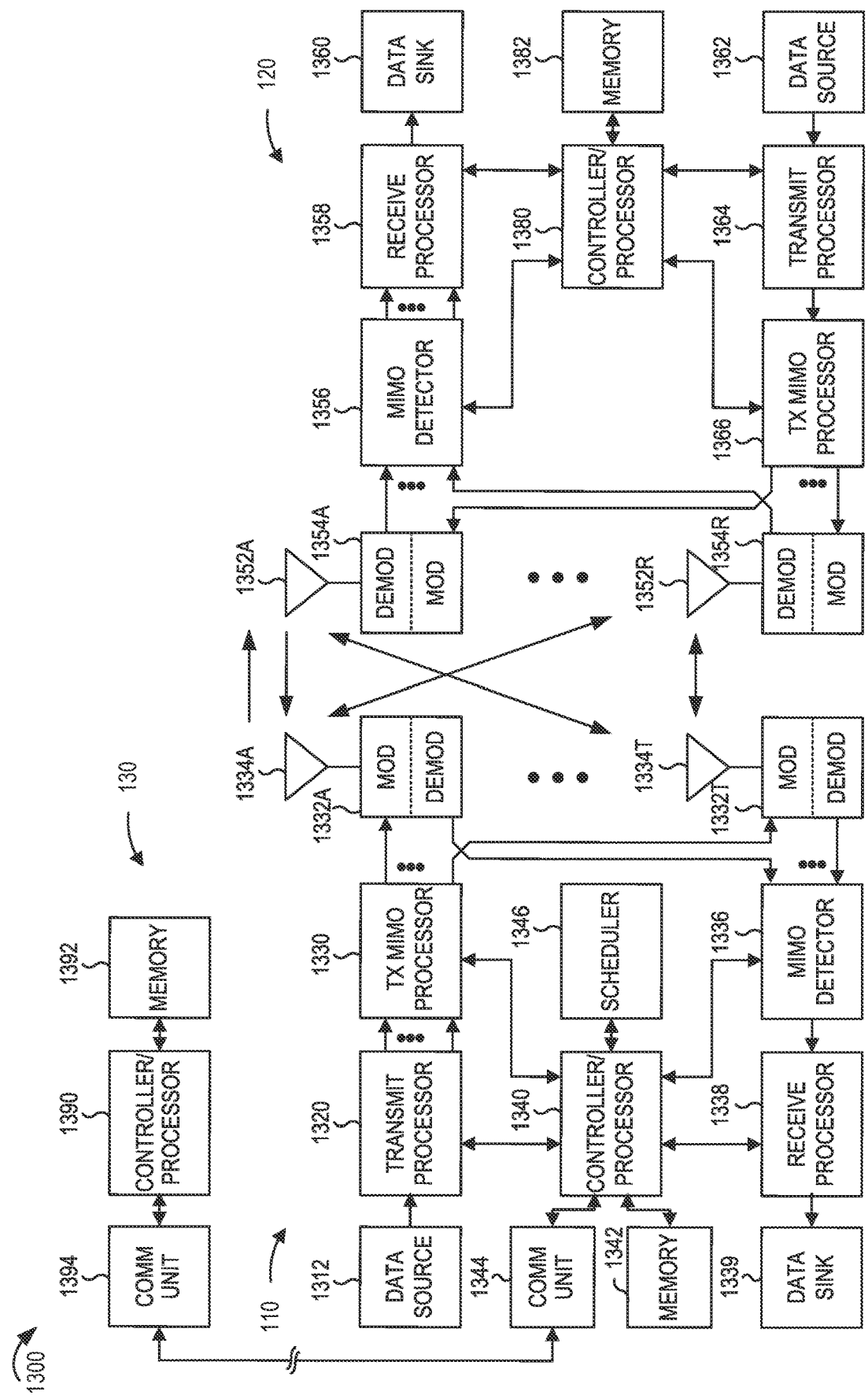
FIG. 13 shows a block diagram conceptually illustrating an example of a base station in communication with a UE in a wireless network.

FIG. 13 is a block diagram conceptually illustrating an example 1300 of a base station 110 in communication with a UE 120. In some aspects, base station 110 and UE 120 may respectively be one of the base stations and one of the UEs in wireless \ network 100 of FIG. 1. Base station 110 may be equipped with T antennas 1334A through 1334T, and UE 120 may be equipped with R antennas 1352A through 1352R, where in general T≥1 and R≥1.

At base station 110, a transmit processor 1320 may receive data from a data source 1312 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 1320 also may process system information (for example, for semi-static resource partitioning information (SRPI), etc.) and control information (for example, CQI requests, grants, upper layer signaling, etc.) and provide overhead symbols and control symbols. The transmit processor 1320 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 1330 may perform spatial processing (for example, precoding) on the data symbols, the control symbols, the overhead symbols, or the reference symbols, if applicable, and may provide T output symbol streams to T modulators-demodulators (MODs-DEMODs) 1332A through 1332T (which also may be referred to as mods/demods or modems). Each MOD-DEMOD 1332 may process a respective output symbol stream (for example, for OFDM, etc.) to obtain an output sample stream. Each MOD-DEMOD 1332 may further process (for example, convert to analog, amplify, filter, and upconvert) the output sample stream to obtain a downlink signal. T downlink signals from MODs-DEMODs 1332A through 1332T may be transmitted via T antennas 1334A through 1334T, respectively. According to various aspects described in more detail below, the synchronization signals can be generated with location encoding to convey additional information.

At UE 120, antennas 1352A through 1352R may receive the downlink signals from base station 110 or other base stations and may provide received signals to modulators-demodulators (MODs-DEMODs) 1354A through 1354R, respectively (which also may be referred to as mods/demods or modems). Each MOD-DEMOD 1354 may condition (for example, filter, amplify, downconvert, and digitize) a received signal to obtain input samples. Each MOD-DE-MOD 1354 may further process the input samples (for example, for OFDM, etc.) to obtain received symbols. A MIMO detector 1356 may obtain received symbols from all R MODs-DEMODs 1354A through 1354R, perform MIMO detection on the received symbols if applicable, and provide detected symbols. A receive processor 1358 may process (for example, demodulate and decode) the detected symbols, provide decoded data for UE 120 to a data sink 1360, and provide decoded control information and system information to a controller or processor (controller/processor) 1380. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 1364 may receive and process data from a data source 1362 and control information (for example, for reports including RSRP, RSSI, RSRQ, CQI, etc.) from controller/processor 1380. Transmit processor 1364 also may generate reference symbols for one or more reference signals. The symbols from transmit processor 1364 may be precoded by a TX MIMO processor 1366 if applicable, further processed by MODs-DEMODs 1354A through 1354R (for example, for DFT-s-OFDM, CP-OFDM, etc.), and transmitted to base station 110. At base station 110, the uplink signals from UE 120 and other UEs may be received by antennas 1334, processed by MOD-DEMOD 1332, detected by a MIMO detector 1336 if applicable, and further processed by a receive processor 1338 to obtain decoded data and control information sent by UE 120. Receive processor 1338 may provide the decoded data to a data sink 1339 and the decoded control information to a controller or processor (i.e., controller/processor) 1340. The base station 110 may include communication unit 1344 and may communicate to network controller 130 via communication unit 1344. The network controller 130 may include communication unit 1394, a controller or processor (i.e., controller/processor) 1390, and memory 1392.

The controller/processor 1340 of base station 110, the controller/processor 1380 of UE 120, or any other component(s) of FIG. 13 may perform one or more techniques associated with implementing a dual registration mode and a dual receive (Rx) mode based on DSS using a single radio, as described in more detail elsewhere herein. For example, the controller/processor 1340 of base station 110, the controller/processor 1380 of UE 120, or any other component(s) (or combinations of components) of FIG. 13 may perform or direct operations of, for example, the process described with reference to FIG. 10, or other processes as described herein, such as the processes described in FIGS. 2-9. The memories 1342 and 1382 may store data and program codes for base station 110 and UE 120, respectively. A scheduler 1346 may schedule UEs for data transmission on the downlink, the uplink, or a combination thereof.

The stored program codes, when executed by the controller/processor 1380 or other processors and modules at UE 120, may cause the UE 120 to perform the process described with reference to FIG. 10, or other processes as described herein, such as the processes described in FIGS. 2-9. The stored program codes, when executed by the controller/processor 1340 or other processors and modules at base station 110, may cause the base station 110 to perform the process described with reference to FIG. 10, or other processes as described herein, such as the processes described in FIGS. 2-9. A scheduler 1346 may schedule UEs for data transmission on the downlink, the uplink, or a combination thereof.

In some aspects, UE 120 may include means for performing the process described with reference to FIG. 10, or other processes as described herein, such as the processes described in FIGS. 2-9. In some aspects, such means may include one or more components of UE 120 described in connection with FIG. 13.

In some aspects, base station 110 may include means for performing the process described with reference to FIG. 10, or other processes as described herein, such as the processes described in FIGS. 2-9. In some aspects, such means may include one or more components of base station 110 described in connection with FIG. 13.

While blocks in FIG. 13 are illustrated as distinct components, the functions described above with respect to the blocks may be implemented in a single hardware, software, or combination component or in various combinations of components. For example, the functions described with respect to the transmit processor 1364, the receive processor 1358, the TX MIMO processor 1366, or another processor may be performed by or under the control of controller/processor 1380.

Figure 14:
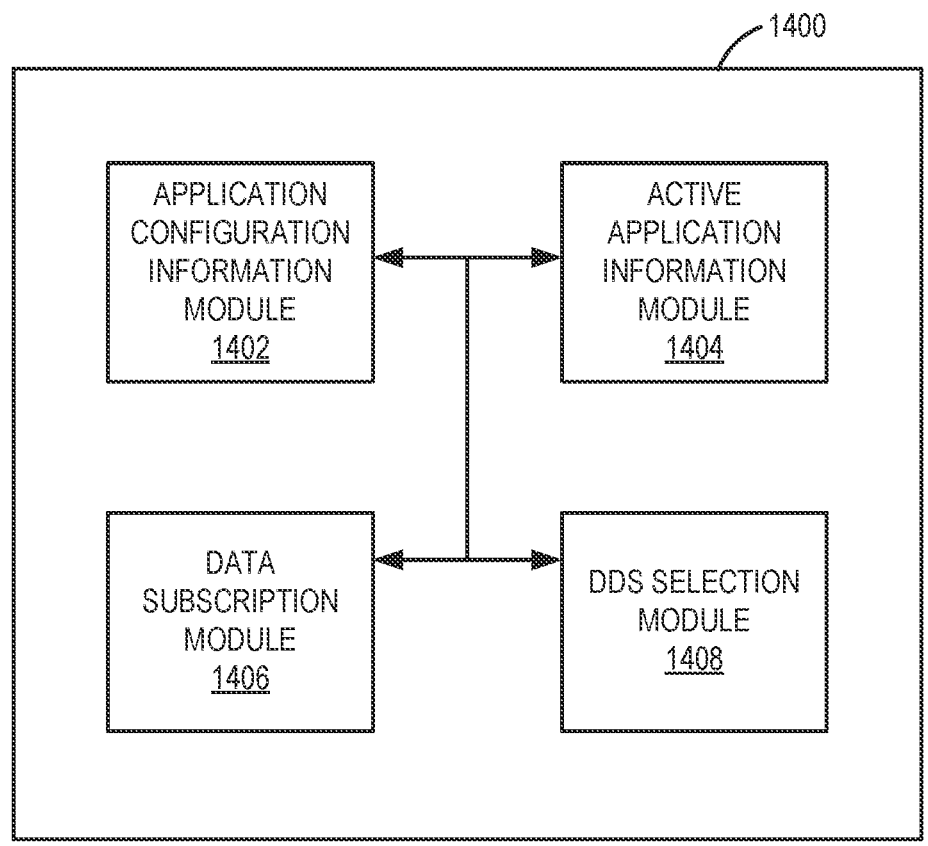
FIG. 14 shows a block diagram of an example system capable of selecting a dedicated data subscription.

FIG. 14 shows a block diagram of an example system 1400 capable of selecting a dedicated data subscription. In some implementations, the system 1400 is configured to perform one or more of the processes described above. The example 1400 may be an example implementation of the wireless communication apparatus 1100 described with reference to FIG. 11. For example, the system 1400 can be a chip, SoC, chipset, package or device that includes at least one processor and at least one modem (for example, a cellular modem). In some implementations, the system 1400 can be a device for use in a UE, such as the UE 120, wireless communication apparatus 1100, or mobile communication device 1204 described herein. In some other implementations, the system 1400 can be a UE or apparatus that includes such a chip, SoC, chipset, package or device as well as at least one transmitter, at least one receiver, and at least one antenna.

The system 1400 includes an application configuration information module 1402, an application activity information module 1404, a data subscription module 1406, and a DDS selection module 1408. Portions of one or more of the modules 1402, 1404, 1406 and 1408 may be implemented at least in part in hardware or firmware. For example, the application configuration information module 1402, the application activity information module 1404, the data subscription module 1406 and the DDS selection module 1408 may be implemented at least in part by a modem (such as the modem 1102). In some implementations, portions of some of the modules 1402, 1404, 1406, 1408 or 1410 may be implemented at least in part as software stored in a memory (such as the memory 1108). For example, portions of one or more of the modules 1402, 1404, 1406 or 1408 can be implemented as non-transitory instructions (or "code") executable by a processor (such as the processor 1106) to perform the functions or operations of the respective module.

The application configuration information module 1402 is configured to generate or determine application configuration information. For example, the application configuration information module 1402 may maintain an application identifier, priority, and list of IINs for one or more applications.

The application activity information module 1404 is configured to generate or determine application activity information. For example, the application activity information module 1404 may obtain the application activity information from an application processor of the UE. The application activity information may indicate which applications are active in a foreground process of the application processor.

The data subscription module 1406 is configured to generate or determine a list of available data subscriptions. For example, the data subscription module 1406 may determine which IINs are available for use by the UE based on the SIM cards that are installed in the UE.

The DDS selection module 1408 is configured to select a data subscription to activate as the DDS of the UE. For example, the DDS selection module 1408 may select the DDS based on the application activity information, the application configuration information, and the list of available data subscriptions from the application configuration information module 1402, the application activity information module 1404, and the data subscription module 1406, respectively.

Figure 15:
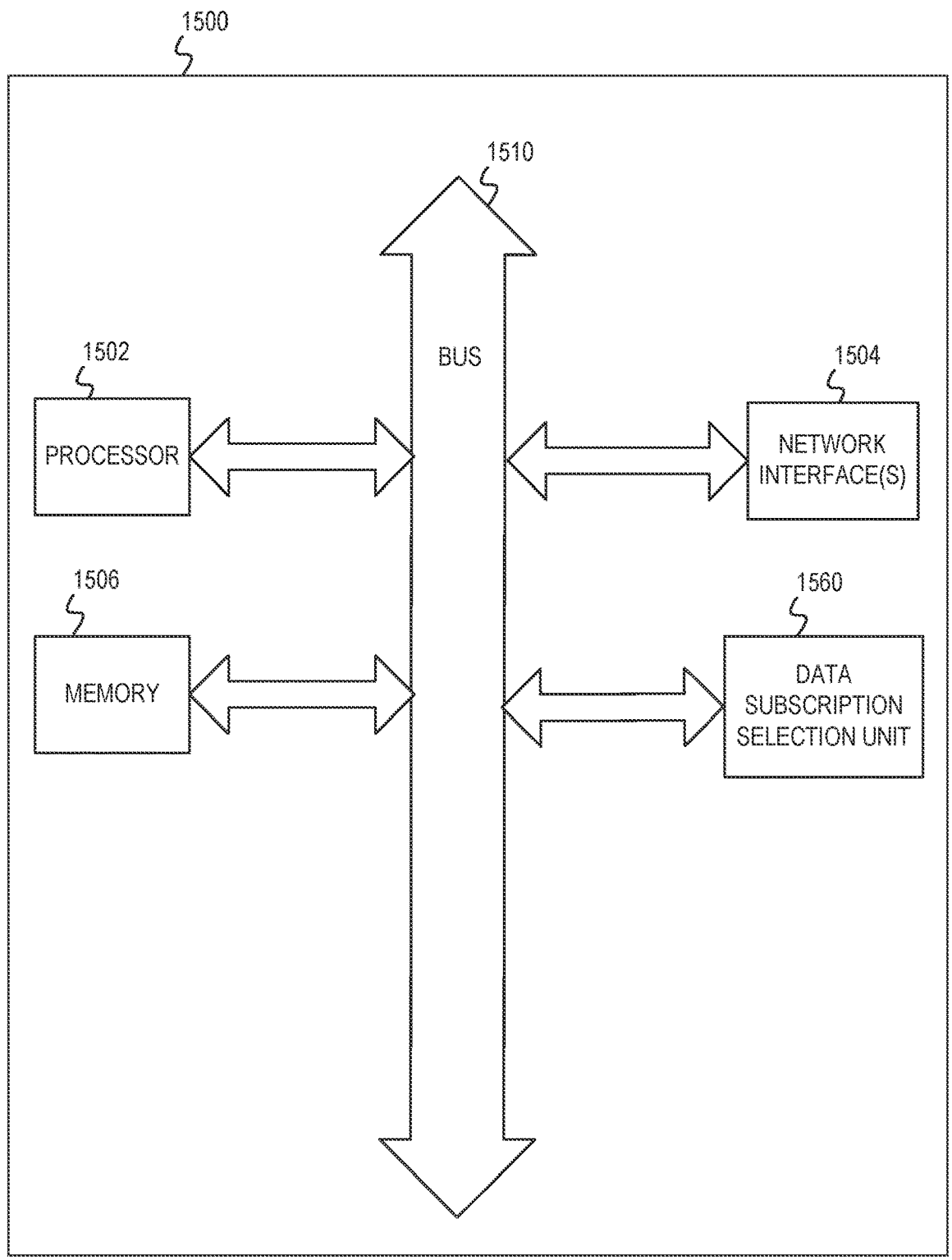
FIG. 15 shows a block diagram of an example electronic device.

FIG. 15 shows a block diagram of an example electronic device. In some implementations, the electronic device 1500 may be a UE (including any of the UEs described herein). The electronic device 1500 can include a processor 1502 (possibly including multiple processors, multiple cores, multiple nodes, or implementing multi-threading, etc.). The electronic device 1500 also can include a memory 1506. The memory 1506 may be system memory or any one or more of the possible realizations of computer-readable media described herein. The electronic device 1500 also can include a bus 1510 (such as PCI, ISA, PCI-Express, Hyper-Transport®, InfiniBand®, NuBus,® AHB, AXI, etc.), and a network interface 1504 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1500 may support multiple network interfaces—each of which is configured to couple the electronic device 1500 to a different communication network.

The electronic device 1500 may include a data subscription selection unit 1560. In some implementations, the data subscription selection unit 1560 may be distributed within the processor 1502, the memory 1506, and the bus 1510. The data subscription selection unit 1560 may perform some or all of the operations described herein.

The memory 1506 can include computer instructions executable by the processor 1502 to implement the functionality of the implementations described in FIGS. 1-14. Any of these functionalities may be partially (or entirely) implemented in hardware or on the processor 1502. For example, the functionality may be implemented with an application-specific integrated circuit, in logic implemented in the processor 1502, in a co-processor on a peripheral device or card, etc. Further, realizations may include fewer or additional components not illustrated in FIG. 15 (such as video cards, audio cards, additional network interfaces, peripheral devices, etc.). The processor 1502, the memory 1506, and the network interface 1504 may be coupled to the bus 1510. Although illustrated as being coupled to the bus 1510, the memory 1506 may be coupled to the processor 1502.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

One innovative aspect of the subject matter described in this disclosure can be implemented in a method of wireless communication performed by an apparatus for use in a user equipment (UE). The method may include determining that one or more applications that are active in the UE based on application activity information. The method may include selecting a first data subscription from among a plurality of data subscriptions available for use as a dedicated data subscription (DDS) of the UE. The first data subscription may be selected based on application configuration information for the one or more applications that are active. The method may include activating the first data subscription as the DDS.

In some implementations, the operations of selecting and activating the first data subscription may be performed by a communication unit of the UE. The communication unit may be configured to switch the DDS based on the application activity information. The communication unit may receive the application activity information from an application processor (AP) via a communication control unit of the UE.

In some implementations, the operations of selecting the first data subscription may be performed by a communication control unit of the UE. The communication unit may receive the application activity information from an application processor (AP) of the UE. The method may include sending a DDS switch request from the communication control unit to a communication unit of the UE.

In some implementations, the operations of selecting and activating the first data subscription is performed by an AP of the UE. The method may include sending a DDS switch request from the AP to a communication unit via a communication control unit of the UE.

In some implementations, activating the first data subscription may include determining that a second data subscription is currently activated as the DDS of the UE and performing a DDS switch to deactivate the second data subscription and activate the first data subscription.

In some implementations, performing the DDS switch may include outputting a first message to a first communication network to activate the first data subscription, and outputting a second message to a second communication network to cause the second data subscription to go into an idle mode.

In some implementations, activating the first data subscription as the DDS may include causing a communication unit of the UE to use a first subscriber information module (SIM) card different from a second SIM card.

In some implementations, the method may include determining that the UE is in a voice call and refraining from performing the DDS switch until after the voice call ends.

In some implementations, the method may include, before performing the DDS switch, starting a timer associated with a wait period and delaying the DDS switch until after the timer indicates completion of the wait period.

In some implementations, the method may include selecting a radio access technology (RAT) associated with the first data subscription from among a plurality of RATs supported by the first data subscription. Activating the first data subscription may include activating the first data subscription using the selected RAT.

In some implementations, selecting the first data subscription may include determining that the first data subscription and the second data subscription are equally preferable based on the application activity information and the application configuration information. The method may include selecting the first data subscription based on a weighted list of available RATs from among the first data subscription and the second data subscription.

In some implementations, the application activity information includes a list of active applications. The list of active applications may be based on a list of applications in a foreground of a user interface of the UE, a list of applications executing in a foreground process of an application processor (AP) of the UE, or a list of applications that are attempting to transmit or receive data between the AP and a communication unit.

In some implementations, the method may include determining the plurality of data subscriptions based on a corresponding plurality of subscriber information module (SIM) cards installed in the UE. Each SIM card may store an issuer identification number (IIN) associated with a different available data subscription. A first IIN may be associated with a first data subscription (Sub1) and a second IIN may be associated with a second data subscription (Sub2).

In some implementations, selecting the first data subscription may include obtaining the application configuration information. The application configuration information may include lists of IINs in relationship to different application identifiers. The method may include determining one or more candidate IINs based on a first list of IINs in the application configuration information for at least a first application identifier included in the application activity information. The method may include selecting the first data subscription based on a match between the one or more candidate IINs and either the first TIN or the second TIN.

In some implementations, the application configuration information may include a priority associated with each of the different application identifiers. Selecting the first data subscription may include retrieving the first list of IINs associated with the first application identifier having a highest priority indicated by the application activity information and that also includes at least the first TIN or the second IIN.

In some implementations, the first list of IINs includes a weighting value associated with each candidate TIN in first list of IINs. Selecting the first data subscription may include selecting either the first IIN or the second TIN based on their weighting value in the first list of IINs.

In some implementations, the method may include determining that the application activity information includes a first application identifier for a first application and a second application identifier for a second application that share a highest priority in the application configuration information and that the application configuration information includes either the first IIN or the second IIN in the corresponding lists of IINs for both the first and second applications identifiers. The method may include determining a first weight for the first TIN based on a sum of weighting values for the first TIN in the corresponding lists of IINs for the first and second application identifiers. The method may include determining a second weight for the second IIN based on a sum of weighting values for the second IIN in the corresponding lists of IINs for the first and second application identifiers. The method may include selecting the first TIN or the second IIN as the first data subscription based on a highest value between the first weight and the second weight.

Another innovative aspect of the subject matter described in this disclosure can be implemented as a UE. The UE may include an interface and a processor configured to perform any one of the above-mentioned methods.

Another innovative aspect of the subject matter described in this disclosure can be implemented as a UE that includes at least one modem and at least one memory communicatively coupled with the at least one processor and storing processor-readable code that, when executed by the at least one processor in conjunction with the at least one modem, is configured to perform the method of any one of the above-mentioned methods.

Another innovative aspect of the subject matter described in this disclosure can be implemented as a mobile communication device. The mobile communication device may include a communication unit having at least one modem and at least one transceiver coupled to the at least one modem. The mobile communication device may include an application processor configured to execute one or more applications and a communication control unit communicatively coupled with the communication unit and the application processor. The communication control unit may be configured to perform the method of any one of the above-mentioned methods. The mobile communication device may include at least one antenna coupled to the at least one transceiver to wirelessly transmit signals output from the at least one transceiver and to wirelessly receive signals for input into the at least one transceiver. The mobile communication device may include a housing that encompasses at least the communication unit, the application processor, the communication control unit, and at least a portion of the at least one antenna.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

The foregoing disclosure provides illustration and description but is not intended to be exhaustive or to limit the aspects to the precise form disclosed. Modifications and variations may be made in light of the above disclosure or may be acquired from practice of the aspects.

As used herein, the terms "user equipment", "wireless communication device", "mobile communication device", "communication device", or "mobile device" refer to any one or all of cellular telephones, smartphones, portable computing devices, personal or mobile multi-media players, laptop computers, tablet computers, smartbooks, Internet-of-Things (IoT) devices, palm-top computers, wireless electronic mail receivers, multimedia Internet enabled cellular telephones, wireless gaming controllers, display sub-systems, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, or other information used to identify or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another. A SIM used in various examples may contain user account information, an international mobile subscriber identity (IMSI), a set of SIM application toolkit (SAT) commands, and storage space for phone book contacts. A SIM card may further store home identifiers (such as, a System Identification Number (SID)/Network Identification Number (NID) pair, a Home Public Land Mobile Number (HPLMN) code, among other examples) to indicate the SIM card network operator provider. An Integrated Circuit Card Identity (ICCID) SIM serial number may be printed on the SIM card for identification. However, a SIM may be implemented within a portion of memory of the mobile communication device, and thus need not be a separate or removable circuit, chip or card.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions encoded on a computer storage media for execution by, or to control the operation of, data processing apparatus.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of storage media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a user equipment (UE), comprising:
   selecting a first data connection from among a plurality of potential data connections in association with application configuration information for one or more applications of the UE;
   activating a first data subscription of the first data connection as a dedicated data subscription (DDS) of the UE in association with a first application of the one or more applications being active in the UE, wherein activating the first data subscription includes transmitting a first message to a first communication network to activate the first data subscription and transmitting a second message to a second communication network to cause a second data subscription to go into an idle mode; and
   communicating traffic for the first application via the first data connection.

2. The method of claim 1, further comprising:
   selecting different data connections of the plurality of potential data connections as the DDS of the UE in association with different applications of the one or more applications becoming active in the UE and the application configuration information for the different applications.

3. The method of claim 1, further comprising:
   obtaining application activity information from an application processor (AP) of the UE, the application activity information indicating that the first application is active in the UE.

4. The method of claim 1, wherein said selecting the first data connection is performed by at least one member of a group consisting of an application processor (AP) of the UE, a communication control unit of the UE, and a modem of the UE.

5. The method of claim 1, further comprising:
   wherein selecting the first data connection includes selecting a selected radio access technology (RAT) from among a plurality of RATs supported by the first data subscription, and
   wherein activating the first data connection includes transmitting the first message to activate the first data subscription using the selected RAT.

6. The method of claim 1, further comprising:
   refraining from changing the DDS of the UE while the UE is in a voice call.

7. The method of claim 1, wherein the first data subscription is associated with a first radio access technology or a first communication network, and wherein the second data subscription is associated with a second radio access technology of the second communication network.

8. The method of claim 1, further comprising:
   obtaining application activity information that indicates which applications are active in the UE; and
   activating the first data subscription as the DDS in association with the application configuration information for those applications that are active.

9. The method of claim 1, wherein activating the first data subscription as the DDS includes causing a communication unit of the UE to use a first subscriber information module (SIM) card associated with the first data subscription different from a second SIM card associated with the second data subscription.

10. The method of claim 1, further comprising, before activating the first data subscription as the DDS:
    starting a timer associated with a wait period; and
    delaying activation of the first data subscription as the DDS until after the timer indicates completion of the wait period.

11. The method of claim 1, further comprising:
    obtaining application activity information, wherein the application activity information includes a list of active applications that are active in the UE, the list of active applications based on at least one member selected from a group consisting of:
    a list of applications in a foreground of a user interface of the UE;
    a list of applications executing in a foreground process of an application processor (AP) of the UE; and
    a list of applications that are attempting to transmit or receive data between the AP and a communication unit.

12. The method of claim 1, wherein selecting the first data connection includes:
    obtaining the application configuration information, wherein the application configuration information includes lists of issuer identification number (IINs) in relationship to different application identifiers;
    identifying one or more candidate IINs based on a first list of IINs in the application configuration information for the first application; and
    selecting the first data connection based on a match between the one or more candidate IINs and either a first TIN associated with the first data subscription or a second TIN associated with the second data subscription.

13. The method of claim 12, wherein the application configuration information includes a priority associated with each of the different application identifiers, and wherein selecting the first data connection includes:
retrieving the first list of IINs associated with the first application identifier having a highest priority indicated by the application activity information and that also includes at least the first IIN or the second IIN.

14. The method of claim 13,
wherein the first list of IINs includes a weighting value associated with each candidate IIN in first list of IINs, and
wherein selecting the first data subscription includes selecting either the first IIN or the second IIN based on their weighting value in the first list of IINs.

15. The method of claim 13,
wherein the application activity information includes a first application identifier for a first application and a second application identifier for a second application that share a highest priority in the application configuration information,
wherein the application configuration information includes either the first IIN or the second IIN in the corresponding lists of IINs for both the first and second applications identifiers,
wherein a first weight for the first IIN is based on a sum of weighting values for the first IIN in the corresponding lists of IINs for the first and second application identifiers, and
wherein a second weight for the second IIN is based on a sum of weighting values for the second IIN in the corresponding lists of IINs for the first and second application identifiers, the method further comprising:
selecting the first IIN or the second IIN as the first data subscription based on a highest value between the first weight and the second weight.

16. A user equipment (UE), comprising:
at least one processor configured to:
select a first data connection from among a plurality of potential data connections in association with application configuration information for one or more applications of the UE, and
activate a first data subscription of the first data connection as a dedicated data subscription (DDS) of the UE in association with a first application of the one or more applications being active in the UE; and
at least one modem configured to:
output a first message for transmission to a first communication network to activate the first data subscription,
output a second message for transmission to a second communication network to cause a second data subscription to go into an idle mode, and
output traffic associated with the first application for transmission via the first data connection.

17. The UE of claim 16, wherein the at least one processor is further configured to select different data connections of the plurality of potential data connections as the DDS of the UE in association with different applications of the one or more applications becoming active in the UE and the application configuration information for the different applications.

18. The UE of claim 16, wherein the at least one processor is further configured to obtain application activity information from an application processor (AP) of the UE, the application activity information indicating that the first application is active in the UE.

19. The UE of claim 16, wherein the at least one processor is included in, or part of, at least one member of a group consisting of an application processor (AP) of the UE, a communication control unit of the UE, and the at least one modem of the UE.

20. The UE of claim 16,
wherein the at least one processor is configured to select a selected radio access technology (RAT) from among a plurality of RATs supported by the first data subscription, and
wherein the at least one modem is configured to output the first message to activate the first data subscription using the selected RAT.

21. The UE of claim 16, wherein the first data subscription is associated with a first radio access technology or a first communication network, and wherein the second data subscription is associated with a second radio access technology of the second communication network.

22. The UE of claim 18, wherein the at least one processor is further configured to:
obtain application activity information that indicates which applications are active in the UE; and
activate the first data subscription as the DDS in association with the application configuration information for those applications that are active.

23. The UE of claim 16, wherein the at least one processor is further configured to obtain application activity information, wherein the application activity information includes a list of active applications that are active in the UE, the list of active applications based on at least one member selected from a group consisting of:
a list of applications in a foreground of a user interface of the UE;
a list of applications executing in a foreground process of an application processor (AP) of the UE; and
a list of applications that are attempting to transmit or receive data between the AP and a communication unit.

24. The UE of claim 16, further comprising:
at least one transceiver coupled to the at least one modem;
an application processor configured to execute the one or more applications;
at least one antenna coupled to the at least one transceiver to wirelessly transmit signals output from the at least one transceiver and to wirelessly receive signals for input into the at least one transceiver; and
a housing that encompasses at least the at least one modem, the at least one transceiver, the application processor, and at least a portion of the at least one antenna.

25. The UE of claim 16, wherein the at least one processor is further configured to refrain from changing the DDS of the UE while the UE is in a voice call.

26. The UE of claim 16, wherein the at least one processor is further configured to:
obtain the application configuration information, wherein the application configuration information includes lists of issuer identification number (IINs) in relationship to different application identifiers;
identify one or more candidate IINs based on a first list of IINs in the application configuration information for the first application; and
select the first data connection based on a match between the one or more candidate IINs and either a first IIN associated with the first data subscription or a second IIN associated with the second data subscription.

27. A system comprising:

means for selecting a first data connection from among a plurality of potential data connections in association with application configuration information for one or more applications of the UE;

means for activating a first data subscription of the first data connection as a dedicated data subscription (DDS) of the UE in association with a first application of the one or more applications being active in the UE, wherein the means for activating the first data subscription includes means for transmitting a first message to a first communication network to activate the first data subscription and means for transmitting a second message to a second communication network to cause a second data subscription to go into an idle mode; and means for communicating traffic for the first application via the first data connection.

28. The system of claim 27, further comprising:

means for selecting different data connections of the plurality of potential data connections as the DDS of the UE in association with different applications of the one or more applications becoming active in the UE and the application configuration information for the different applications.

29. The system of claim 27, further comprising:

means for refraining from changing the DDS of the UE while the UE is in a voice call.

30. The system of claim 27, wherein the means selecting the first data connection includes:

means for obtaining the application configuration information, wherein the application configuration information includes lists of issuer identification number (IINs) in relationship to different application identifiers;

means for identifying one or more candidate IINs based on a first list of IINs in the application configuration information for the first application; and means for selecting the first data connection based on a match between the one or more candidate IINs and either a first IIN associated with the first data subscription or a second IIN associated with the second data subscription.

\* \* \* \* \*